(12) United States Patent
Morii

(10) Patent No.: US 8,867,051 B2
(45) Date of Patent: Oct. 21, 2014

(54) PRINTING SYSTEM, IMAGE FORMING APPARATUS, PRINT DATA MANAGING METHOD THEREOF, AND PROGRAM

(75) Inventor: Hiroyuki Morii, Matsudo (JP)

(73) Assignee: Canon Marketing Japan Kabushiki Kaisha, Tokyo (JP)

( * ) Notice: Subject to any disclaimer, the term of this patent is extended or adjusted under 35 U.S.C. 154(b) by 100 days.

(21) Appl. No.: 13/536,068

(22) Filed: Jun. 28, 2012

(65) Prior Publication Data

US 2013/0003125 A1    Jan. 3, 2013

(30) Foreign Application Priority Data

Jun. 30, 2011 (JP) ................................. 2011-145595
Mar. 23, 2012 (JP) ................................. 2012-066992

(51) Int. Cl.
*G06F 3/12* (2006.01)
*G06K 15/02* (2006.01)
*G06K 15/00* (2006.01)

(52) U.S. Cl.
CPC .............. *G06F 3/122* (2013.01); *G06F 3/1285* (2013.01); *G06K 15/1817* (2013.01); *G06K 15/4005* (2013.01); *G06F 3/1291* (2013.01); *G06F 3/1238* (2013.01); *G06F 3/1267* (2013.01); *G06K 15/405* (2013.01)

USPC ........ 358/1.13; 358/1.15; 358/1.14; 709/217; 726/4

(58) Field of Classification Search
CPC . G06F 3/1285; G06F 3/1291; G06K 15/4005; G06K 15/405
USPC ............. 358/1.15, 1.14, 1.13; 709/217; 726/4
See application file for complete search history.

(56) References Cited

U.S. PATENT DOCUMENTS

2005/0185214 A1 *  8/2005  Suwabe ....................... 358/1.15
2009/0033983 A1 *  2/2009  Tanaka et al. ................ 358/1.15
2009/0043731 A1 *  2/2009  Sato .................................. 707/2

\* cited by examiner

*Primary Examiner* — Jacky X Zheng
(74) *Attorney, Agent, or Firm* — Canon U.S.A., Inc., IP Division

(57) ABSTRACT

An image forming apparatus that stores print data transmits identification information for identifying itself to another image forming apparatus that includes a notification image forming apparatus is storing print data. When printing print data, the image forming apparatus requests a list of image forming apparatuses in which print data is stored from the another image forming apparatus. The image forming apparatus requests a list of print data from image forming apparatuses corresponding to the received.

13 Claims, 21 Drawing Sheets

Fig.13

| | DOCUMENT NAMES | PRINT SETTING | PAGES/COPYS/TIME | |
|---|---|---|---|---|
| ✓ | JULY SALES REPORT | COLOR/2SIDED /2in1 | 1 PAGE 1 COPY | 06/07 15:47:15 |
| | ATTENDANCE MANAGEMENT REPORT | MONOCHROME /2SIDED/2in1 | 1 PAGE 1 COPY | 06/07 15:50:21 |
| | USER QUESTIONNAIRE REPORT | MONOCHROME /1SIDED/2in1 | 1 PAGE 1 COPY | 06/07 16:04:16 |
| | BUSINESS TRIP APPLICATION | MONOCHROME /2SIDED/1in1 | 1 PAGE 1 COPY | 06/07 16:15:59 | id0001 — RELOAD — PRINTED RESULT — DOCUMENTS 4

1301

SELECT ALL | CANCEL SELECTION | DETAILS | DELETE | START PRINTING

UPON COMPLETION OF OPERATION, DON'T FORGET TO LOG OUT. | LOG OUT 1302     1303

Fig.14

| NAME | VALUE | |
|---|---|---|
| STATUS | UNPRINTED | 1401 |
| FILE NAME | 00001111 | 1402 |
| USER NAME | id0001 | |
| DOCUMENT NAME | JULY SALES REPORT | |
| TIME STAMP | 2010/06/07 15:47:15 | |
| FILE SIZE | 20[KB] | |
| NUMBER OF COPIES | 1 | 1403 |
| NUMBER OF PAGES | 1 | |
| TWO-SIDED PRINTING | TWO-SIDED | |
| PAPER SIZE | A4 | |
| COLOR/MONOCHROME/ TWO-COLOR | COLOR | |
| HOST NAME (STORAGE DESTINATION) | 192.168.0.1 | 1404 |
| MODEL NAME | MFP5050 | 1405 |

Fig.15

| USER NAME | MAIL ADDRESS | CARD ID |
|---|---|---|
| id0001 | mori@xxx.ne.jp | IDm0001 |
| id0002 | sato@xxx.ne.jp | IDm0002 |

Fig.16

| FILE NAME : id0001_MFP5050txt |
|---|
| 192.168.0.1 |
| 192.168.0.2 |
| 192.168.0.3 |

Fig.17

| NAME SERVICE NOTIFICATION DESTINATION |
| --- |
| 192.168.0.1 |
| 192.168.1.1 |
| 192.168.2.1 |
| 192.168.3.1 |
| 192.168.4.1 |
| 192.168.5.1 |
| 192.168.6.1 |
| 192.168.7.1 |
| 192.168.8.1 |
| 192.168.9.1 |

Fig.18

| NOTIFIED NAME SERVICE LIST |
|---|
| 192.168.0.1 |
| 192.168.2.1 |
| 192.168.8.1 |

Fig.21

| NAME SERVICE NOTIFICATION DESTINATION | SETTING |
|---|---|
| NAME SERVICE SETTING | OFF |
| NAME SERVICE 1 | 192.168.0.1 |
| NAME SERVICE 2 | 192.168.1.1 |
| NAME SERVICE 3 | 192.168.2.1 |
| NAME SERVICE 4 | 192.168.3.1 |
| NAME SERVICE 5 | 192.168.4.1 |
| NAME SERVICE 6 | 192.168.5.1 |
| NAME SERVICE 7 | 192.168.6.1 |
| NAME SERVICE 8 | 192.168.7.1 |
| NAME SERVICE 9 | 192.168.8.1 |
| NAME SERVICE 10 | 192.168.9.1 | ic information to perform an operation similar to
PRINTING SYSTEM, IMAGE FORMING APPARATUS, PRINT DATA MANAGING METHOD THEREOF, AND PROGRAM

BACKGROUND OF THE INVENTION

1. Field of the Invention

The present invention relates to a printing system, an image forming apparatus, a processing method thereof, and a program, in which print data is reserved in an image forming apparatus and the reserved print data is printed from a desired image forming apparatus.

2. Description of the Related Art

There has been conventionally known a "pull print (reservation print)" type printing system, where a print request is made from a printing apparatus (hereinafter, referred to as a multifunction peripheral) with respect to print data temporarily reserved on a server, and the print data outputted on the printing apparatus.

With this system, when performing a printing operation from an application, a user can output print data on a desired printing apparatus (for example, Japanese Patent Application Laid-Open No. 2009-176202).

In typical "pull print" systems, a user designates an external print server, not a specific printing apparatus, and loads print data onto the designated print server. Thus, when a commonly used printing apparatus is unavailable, a print instruction can still be issued to the external print server to enable printing on another printing apparatus.

In typical "pull print" systems, the external server needs to be installed, and the external server may be installed with multiple units depending on the number of users. In such a system configuration, the server management load increases. Therefore, there has been a need for systems where no servers are installed/established.

In the case of establishing a server-less system, a configuration that temporarily reserves print data on a hard disk drive (HDD) mounted in the printing apparatus has been considered. However, in order to output print data from another available desired printing apparatus instead of a commonly used printing apparatus, it is necessary to notify the other printing apparatuses constituting the system of a print data storage destination.

This requires preliminarily registering a notification destination in all printing apparatuses. A system having a high probability that the number of installed printing apparatuses will vary, e.g., increase or decrease, needs to constantly maintain a notification destination. Hence, actual operations can become difficult.

Instead of preliminarily registering the notification destination, notification can be accomplished by broadcasting the storage destination information. However, broadcasting is limited to the same segment. Hence, in a large-scale user environment, it is highly likely that the segment will be divided, and print data can be output from only printing apparatuses within a limited range. In addition, since broadcast communication may not check success or failure of the notification, it would be necessary to notify a storage destination whenever print data is received from a client terminal, thereby potentially overloading the associated network.

A function of a management server managing bibliographic information, as discussed in Japanese Patent Application Laid-Open No. 2009-176202, may be provided in a printing apparatus to establish a server. However, whenever print data is received via the printing apparatus, it is necessary to transmit information on the print data to a printing apparatus managing bibliographic information, thus leading to an increase in a network load. In addition, unlike the server, equipment specification of the printing apparatus is low. Hence, it is difficult to cause the printing apparatus managing bibliographic information to perform an operation similar to that of the server, on which load may be intensively imposed.

In consideration of a specification of a printing apparatus, in the case of using the printing apparatus to manage print data or the like, a mechanism with a reduced communication load has been desired.

SUMMARY OF THE INVENTION

An aspect of the present invention is directed managing a list of image forming apparatuses that store print data and reducing communication loads when print data reserved in an image forming apparatus is printed from another image forming apparatus by making a print request to the image forming apparatus where the print data is stored.

According to an aspect of the present invention, a printing system includes a plurality of image forming apparatuses that store print data, the plurality of image forming apparatuses connected to each other and include a first image forming apparatus and a second image forming apparatus. The first image forming apparatus includes a first storage control unit configured to store print data and bibliographic information of the print data in a first storage unit, an image forming apparatus information transmission unit configured to transmit identification information for identifying the first image forming apparatus to the second image forming apparatus and to indicate that print data is stored in the first image forming apparatus, an image forming apparatus information request unit configured to request, from the second image forming apparatus, a list of image forming apparatuses that are storing print data to print the print data stored in the first storage unit, an image forming apparatus list reception unit configured to receive the list of image forming apparatuses, a print data list request unit configured to request a list of print data from image forming apparatuses corresponding to the received list of image forming apparatuses, a print data list reception unit configured to receive the list of print data, a print request unit configured to make a print request to an image forming apparatus in which the print data is stored, and a printing unit configured to print received print data. The second image forming apparatus includes an image forming apparatus information reception unit configured to receive the identification information from the first image forming apparatus, a second storage control unit configured to store the identification information in a second storage unit, an image forming apparatus information request reception unit configured to receive a request for a list of image forming apparatuses from the first image forming apparatus, and an image forming apparatus list transmission unit configured to transmit a list of image forming apparatuses to the first image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a diagram illustrating an example of a print data list screen.

FIG. 14 is a diagram illustrating an example of a bibliographic information file.

FIG. 15 is a diagram illustrating an example of a user information table.

FIG. 16 is a diagram illustrating an example of a name information file.

FIG. 17 is a diagram illustrating an example of a name service notification destination.

FIG. 18 is a diagram illustrating an example of a notified name service list.

FIG. 21 is a diagram illustrating more detailed configuration information of FIG. 17.

DESCRIPTION OF THE EMBODIMENTS

Various exemplary embodiments, features, and aspects of the invention will be described in detail below with reference to the drawings.

Figure 1:
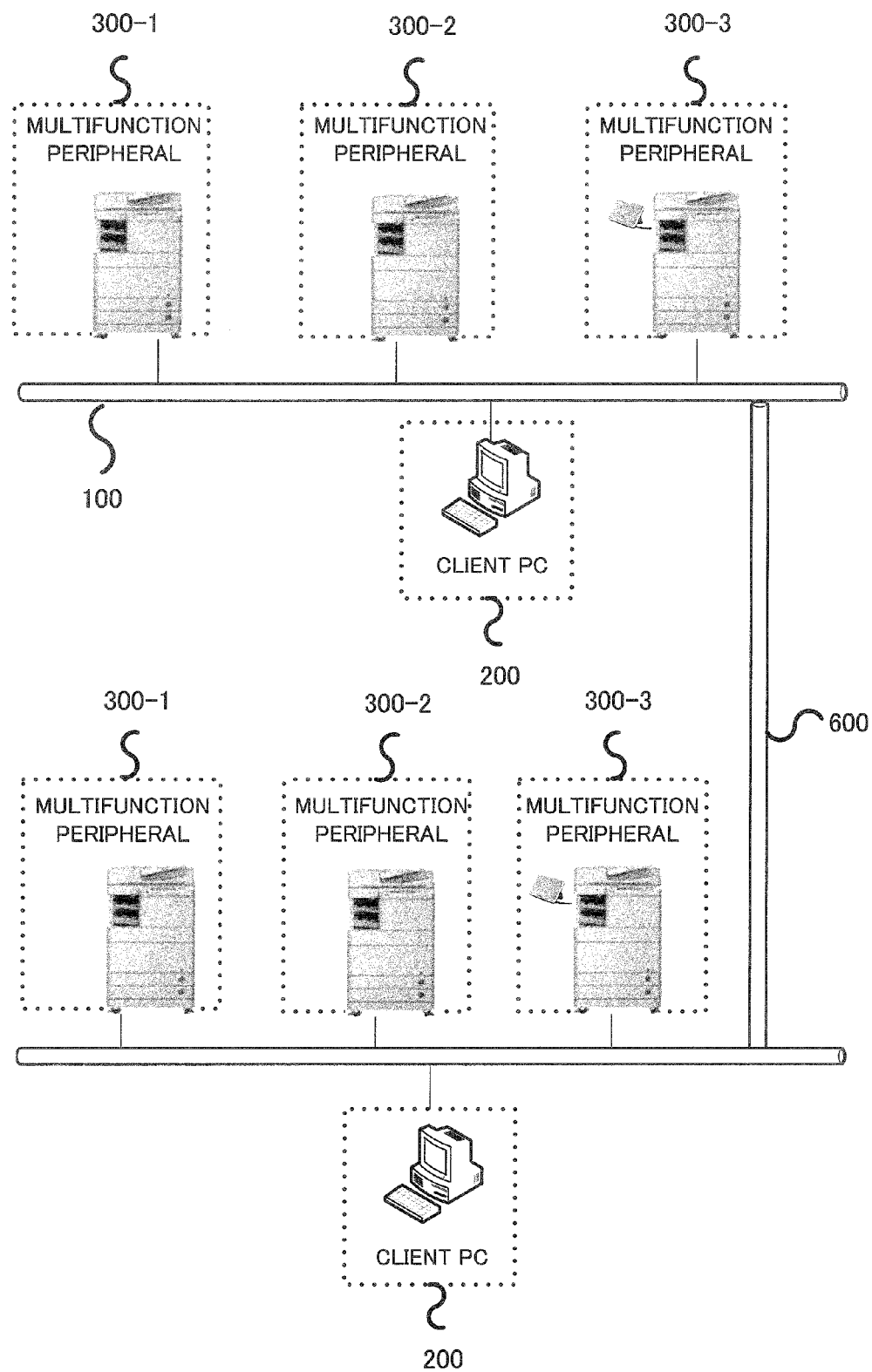
FIG. 1 is a system configuration diagram illustrating an example of a printing system.

FIG. 1 is a system configuration diagram illustrating an example of a configuration of a printing system that is applicable to a multifunction peripheral 300-1 having a print data reception function, a bibliographic information extraction, and print data/bibliographic information management function, a multifunction peripheral 300-2 having a name information management function, a multifunction peripheral 300-3 having a name information acquisition, list acquisition, and multifunction peripheral UI control function depending on a user's instruction, such as print/deletion or the like, and a client PC 200.

In the system configuration of FIG. 1, for description purposes regarding the processing of each function, each function of the multifunction peripheral is separately described, but may operate as one program in exemplary embodiments. The name information management function may operate on all the multifunction peripherals or may operate on only several multifunction peripherals.

A print driver is installed in the client PC 200 and the print driver may generate print data based on data received from an application program. The print driver transmits the print data to the multifunction peripheral 300-1 or the like via a network (LAN 600).

The multifunction peripheral 300-1 may receive the print data from the client PC 200 via the network (LAN 600), and store the print data in a predetermined storage destination. Herein, the predetermined storage destination is referred to as a first storage unit. After receiving the print data, a print instruction management data of the print data is analyzed to extract bibliographic information, such as document name of the analyzed print data, number of copies, number of pages, print settings, or the like, and a bibliographic information file as illustrated in FIG. 14 is generated.

By accepting various requests from other multifunction peripherals, the response of the print data list and the print instruction may be performed according to the request. The print data may be deleted according to the request.

Thus, FIG. 1 illustrates a printing system to which a plurality of multifunction peripherals (image forming apparatuses) capable of storing print data is connected via a network.

Figure 2:
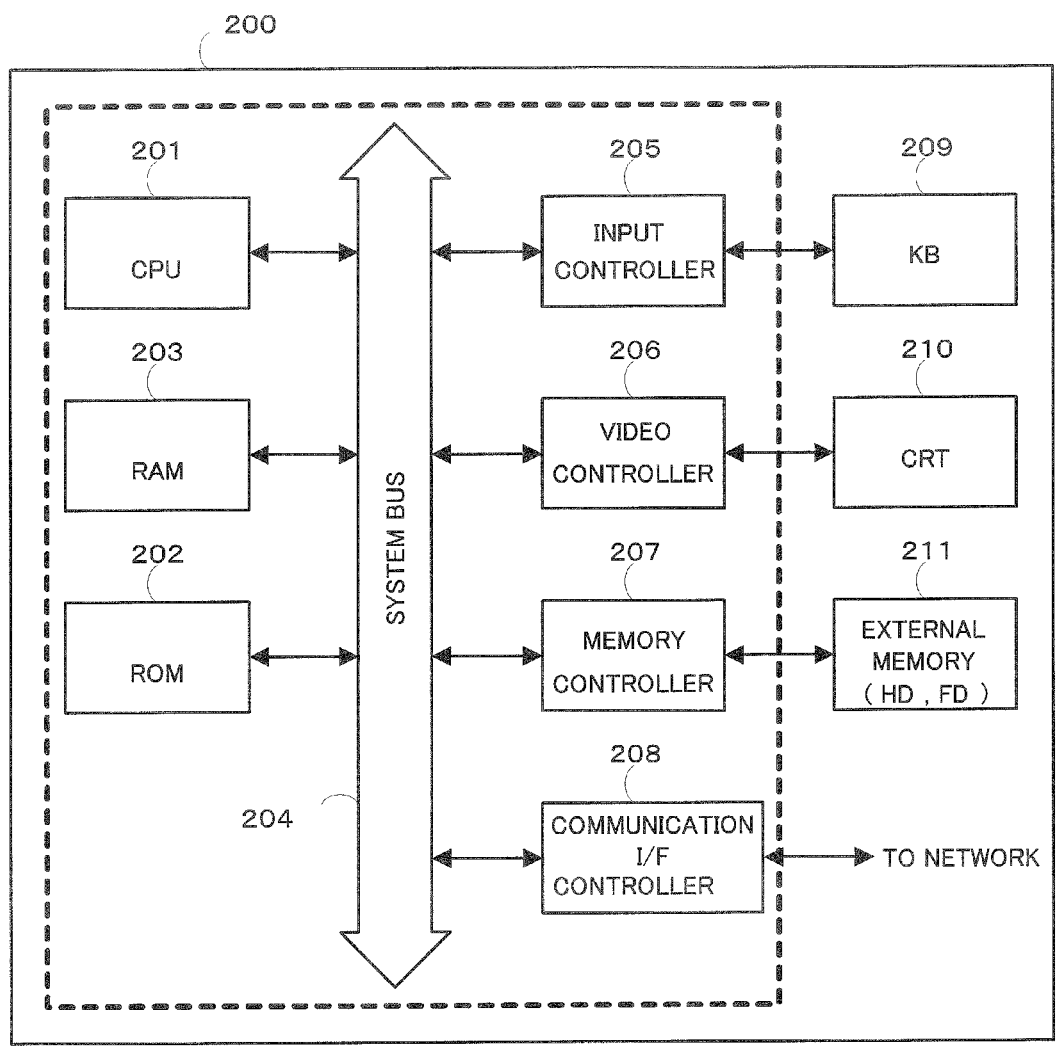
FIG. 2 is a block diagram illustrating a hardware configuration of a client personal computer (PC).

FIG. 2 is a block diagram illustrating a hardware configuration of an information processing apparatus applicable to the client PC 200 illustrated in FIG. 1.

In FIG. 2, a central processing unit (CPU) 201 controls an overall operation of each device and controller connected to a system bus 204. Also, in a read-only memory (ROM) 202 or an external memory 211, various programs to be described later are stored, which are necessary to realize a basic input/output system (BIOS) being a control program of the CPU 201, an operating system program (hereinafter, OS), and a function of executing each server or each PC.

A random access memory (RAM) 203 functions as a main memory for the CPU 201, a work area, or the like. The CPU 201 loads a program or the like, which is necessary during the execution of the processing, on the RAM 203 from the ROM 202 or the external memory 211, and executes the loaded program to realize various operations.

An input controller 205 controls an input from a keyboard (KB) 209, a pointing device, such as a mouse (not illustrated), and the like. A video controller 206 controls displaying to a display device, such as a cathode ray tube display (CRT) 210. Although the display device is represented by the CRT 210 in the present exemplary embodiment, the display device may be any type of display device, such as a liquid crystal display A memory controller 207 controls access to the external memory 211, such as a hard disk (HDD) storing a boot program, various applications, font data, user files, editing files, various data, or the like, a flexible disk (FD), or a Compact-Flash® memory connected to a PCMCIA card slot via an adapter.

A communication I/F controller 208 connects to and communicates with an external device via a network, and performs a communication control processing over the network. For example, the communication I/F controller 208 can communicate using TCP/IP.

The CPU 201, for example, performs outline font rasterizing processing to a display information area in the RAM 203, and enables displaying on the CRT 210. Moreover, the CPU 201 enables a user instruction, such as a mouse cursor (not illustrated), on the CRT 210.

Figure 3:
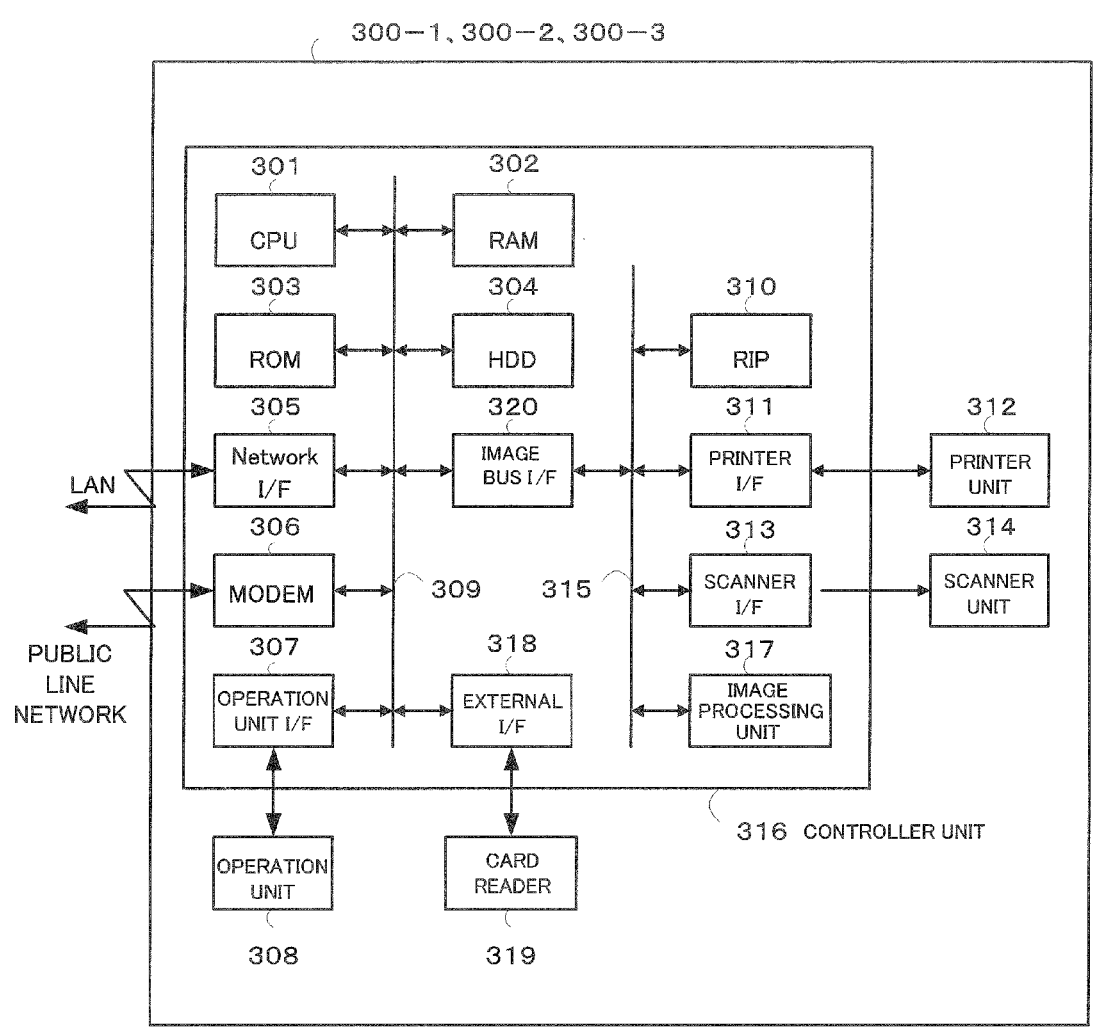
FIG. 3 is a block diagram illustrating an example of a hardware configuration of a multifunction peripheral.

FIG. 3 is a block diagram illustrating a hardware configuration example of the multifunction peripherals 300-1, 300-2, and 300-3 illustrated in FIG. 1.

In FIG. 3, a controller unit 316 connects to a scanner unit 314 functioning as an image input device and a printer unit 312 functioning as an image output device, and connects to a LAN or a public line (WAN) (e.g., PSTN, ISDN, or the like) to perform input and output of image data and device information.

The controller unit 316 includes a CPU 301, which is a processor that controls the entire system. A RAM 302 is a system network memory for the operation of the CPU 301. The RAM 302 is a program memory for recording a program and is an image memory that temporarily records image data.

A system boot program and various control programs are stored in a ROM 303. Various programs for controlling the system, image data, or the like are stored in a hard disk drive (HDD) 304.

An operation unit interface (operation unit I/F) 307 is an interface unit with an operation unit (UI) 308 and outputs image data, which is to be displayed on the operation unit 308, to the operation unit 308.

The operation unit I/F 307 transmits information input via the operation unit 308 by a system user (e.g., user information, or the like) to the CPU 301. The operation unit 308 includes a display unit with a touch panel and may perform various instructions when a user presses buttons displayed on the display unit.

A network interface (network I/F) 305 connects to a network (LAN) and performs data input and output. A MODEM 306 connects to a public line and performs data input and output, such as FAX transmission and reception.

An external interface (external I/F) 318 is an I/F unit that receives an external input of USB, IEEE 1394, printer port, RS-232C, or the like. In the exemplary embodiment, a card reader 319 configured to read an IC card necessary for authentication is connected to the external I/F 318. The CPU 301 may control the information readout from the IC card by the card reader 319 via the external I/F 318, and acquire information read from the IC card. The above-described devices are located on a system bus 309.

An image bus interface (IMAGE BUS I/F) 320 is a bus bridge that connects the system bus 309 to an image bus 315, via which image data is transferred at a high rate, and transforms a data structure.

The image bus 315 is configured with a PCI bus or IEEE 1394. The following devices are located on the image bus 315.

A raster image processor (RIP) 310 rasterizes vector data, such as PDL code, to a bitmap image. A printer interface (printer I/F) 311 connects the printer unit 312 to the controller unit 316 and performs a synchronous/asynchronous conversion of image data. A scanner interface (scanner I/F) 313 connects the scanner unit 314 to the controller unit 316 and performs a synchronous/asynchronous conversion of image data.

An image processing unit 317 performs a correction, processing, and editing on input image data, and performs a printer correction, resolution conversion, or the like on print output image data. In addition, the image processing unit 317 rotates image data and compresses and expands of JPEG with respect to multivalued image data and compresses and expands JBIG, MMR, or MH with respect to binary image data.

The scanner unit 314 illuminates an image on a recording medium being a document and scans the image with a CCD line sensor to convert the image into an electric signal as raster image data. Document sheets are set in a tray of a document feeder, and the user of the apparatus issues a read activation instruction via the operation unit 308. The CPU 301 provides the instruction to the scanner unit 314, and the feeder feeds the document sheets one by one to perform the operation of reading the document image.

The printer unit 312 converts a raster image data into an image on a recording medium. The conversion method includes an electrophotographic method using a photosensitive drum and a photosensitive belt, an inkjet method of directly printing an image on a recording medium by discharging ink from a fine nozzles array, or the like. While an electrophotographic method is described, any conversion method is applicable.

A print operation activation is started by an instruction from the CPU 301. The printer unit 312 has a plurality of recording medium feed stages capable of selecting a different recording medium size or a different recording medium orientation, and includes recording medium cassettes corresponding to the recording medium feed stages.

The operation unit 308 includes a liquid crystal display (LCD) unit with a touch panel. The operation unit 308 displays a system manipulation screen. When a displayed key is pressed, the operation unit 308 transmits relevant position information to the CPU 301 via the operation unit I/F 307. The operation unit 308 includes, for example, a start key, a stop key, an ID key, a reset key, or the like as various manipulation keys.

Herein, the start key of the operation unit 308 is used to start a document image read operation, or the like. A two-color (green and red) LED is provided in the center of the start key. The status of the start key is indicated by a particular color, e.g., green for ready and red for not ready.

The stop key of the operation unit 308 stops the currently selected operation from running. The ID key of the operation unit 308 is used to input a user ID. The reset key is used to initialize a setting from the operation unit.

The card reader 319, which is controlled by the CPU 301, reads information stored in an IC card (for example, Felica®) and notifies the read information to the CPU 301 via the external I/F 318.

As a result of the above-described configuration, the multifunction peripherals 300-1, 300-2, and 300-3 transmit image data read from the scanner unit 314 on the LAN 600, and print out the print data by the printer unit 312 received from the LAN.

The MODEM 306 may transmit the image data read from the scanner unit 314 on the public line by FAX, and the printer unit 312 may output the image data received from the public line by facsimile (FAX).

Figure 4:
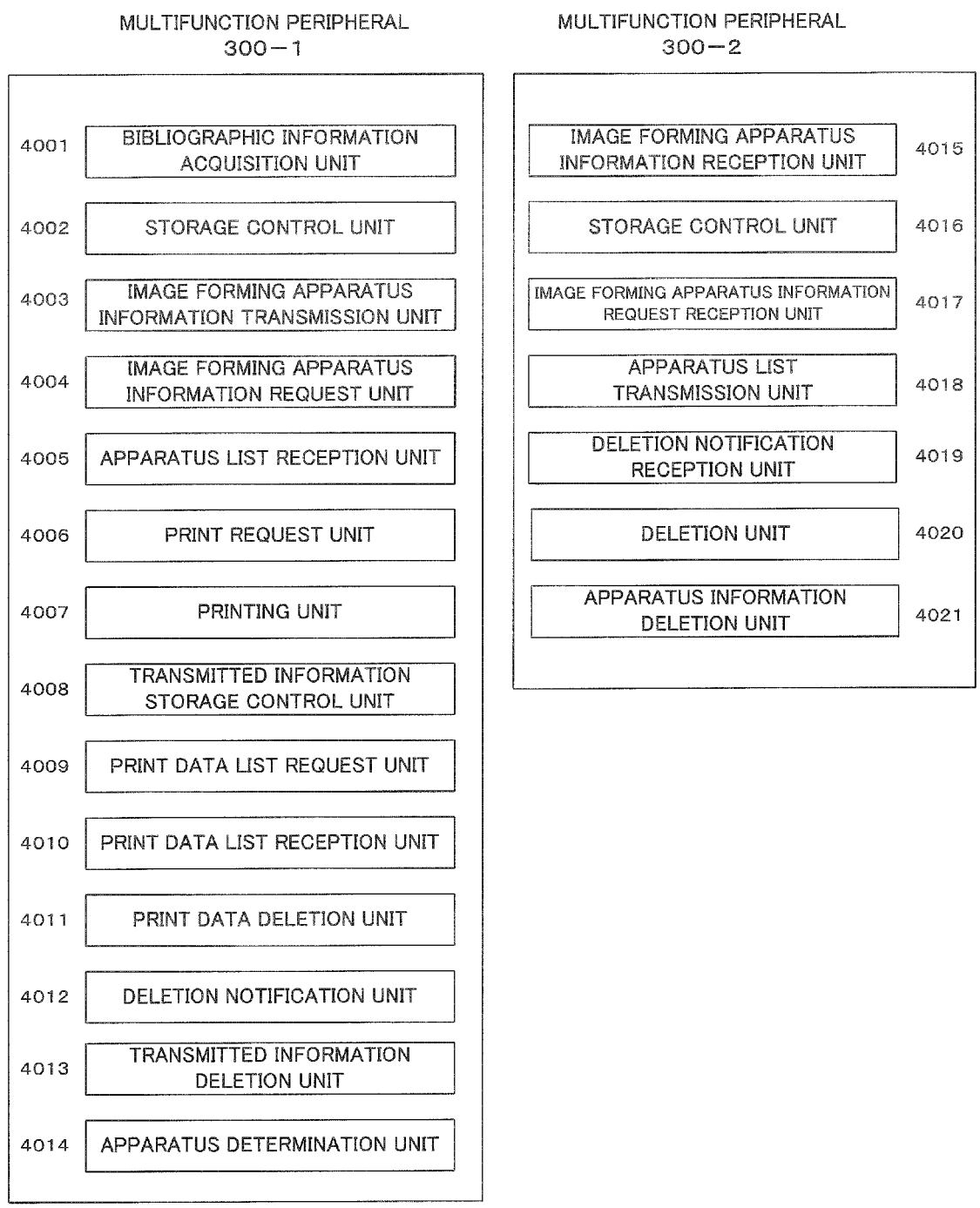
FIG. 4 is a functional block diagram illustrating a function of a multifunction peripheral.

FIG. 4 illustrates a functional block diagram of the respective functions of multifunction peripheral 300-1, 300-2, and 300-3 according to the exemplary embodiment. As illustrated, multifunction peripheral 300-1 and 300-3 include the same functions. Thus, in the following description of the exemplary embodiment, if a reference is made to one these devices, the non-reference device can be substituted for the referenced device an all of the features of the exemplary embodiment can still be achieved.

A bibliographic information acquisition unit 4001 acquires bibliographic information as sociated with print data, where the bibliographic information is used to manage the print data. The bibliographic information includes user identification information.

A storage control unit 4002 stores print data and bibliographic information of the print data in a predetermined storage unit.

An image forming apparatus information transmission unit 4003 transmits information (identification information) for identifying the multifunction peripheral 300-1 to the multifunction peripheral 300-2 and provides an indication that the print data has been stored in the multifunction peripheral 300-1. The image forming apparatus information transmission unit 4003 also transmits user identification information that is a part of the bibliographic information.

An image forming apparatus information request unit 4004 requests a list (device list) of image forming apparatuses being a print data storage destination from the multifunction peripheral 300-2.

An apparatus list (device list) reception unit 4005 receives the device list from the multifunction peripheral 300-2.

Figure 19:
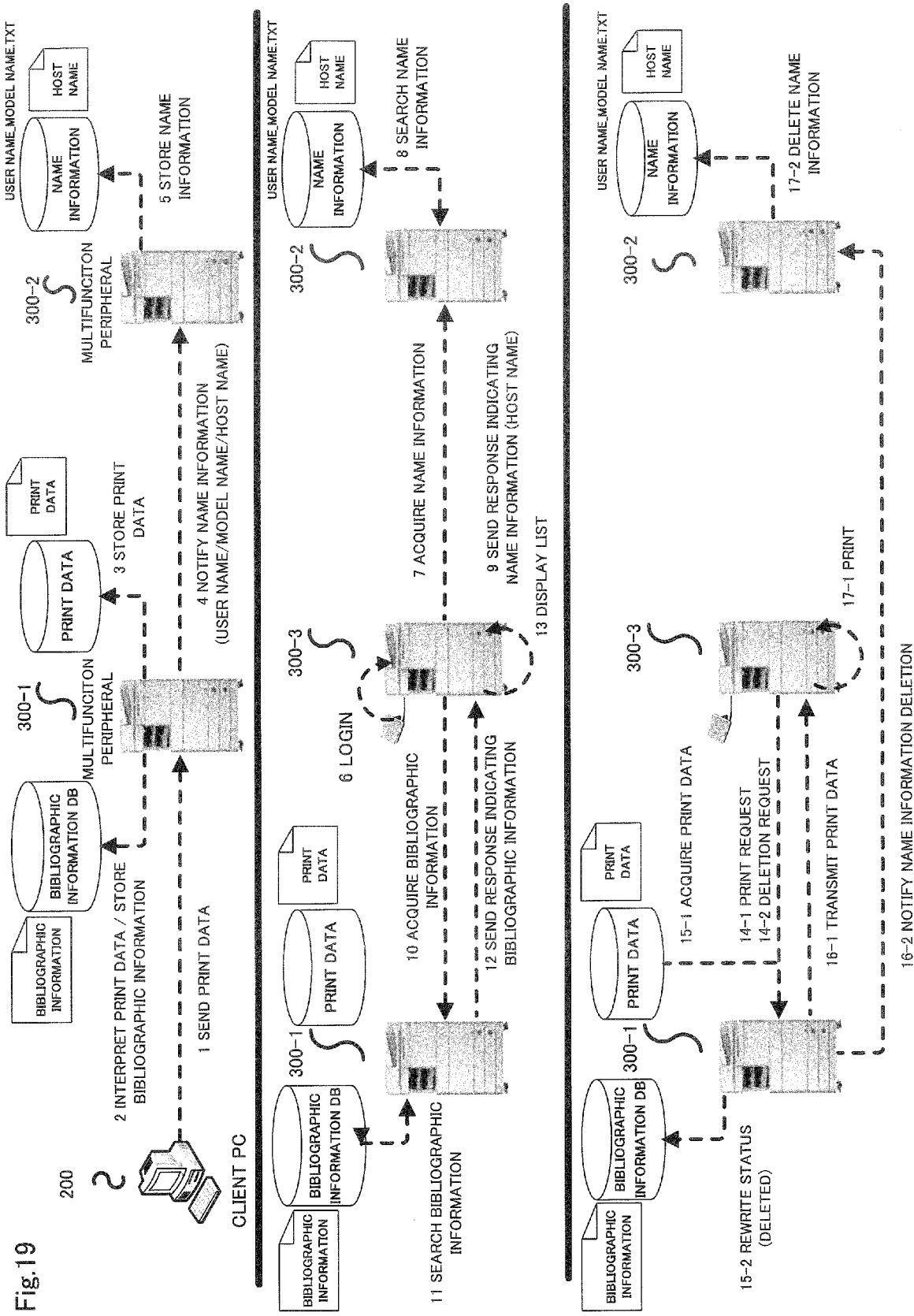
FIG. 19 is a diagram illustrating an overview of processing by a printing system.

A print request unit 4006 makes a print request to an image forming apparatus being a print data storage destination. Referring to FIG. 19, in the case the print data is stored in multifunction peripheral 300-1, multifunction peripheral 300-3 sends the print request to multifunction peripheral 300-1. In the case where the print data is stored in multifunction peripheral 300-3, the print request initiates a printing operation on multifunction peripheral 300-3. Target print data may be selected from a list of print data (data list) received from the image forming apparatus that is selected from the device list.

A printing unit 4007 prints the received print data according to the print request.

A transmitted information storage control unit 4008 stores information (transmitted information) indicating that identification information is transmitted to the multifunction peripheral 300-2 by the information transmission unit 4003 in a predetermined storage unit to manage whether the identification information of the multifunction peripheral 300-1 is already transmitted to the multifunction peripheral 300-2.

When transmission of the identification information is managed, the image forming apparatus information transmission unit 4003 suppresses the transmission of the identification information for identifying the multifunction peripheral 300-1 to the multifunction peripheral 300-2, even when print data is newly stored. Therefore, transmission of redundant information is prevented.

A print data list request unit 4009 provides a request for the list of print data (data list) to the multifunction peripheral 300-1. The print data list request unit 4009 also provides the request to multifunction peripheral 300-3, when multifunction peripheral 300-3 is selected as a data list acquisition target.

A print data list reception unit 4010 receives the data list from the image forming apparatus that requested the list of print data (data list).

A print data deletion unit 4011 deletes the print data or changes the print data to a deleted status.

A deletion notification unit 4012 provides a deletion notification that the print data is in the deleted status to the multifunction peripheral 300-2.

A transmitted information deletion unit 4013 deletes transmitted information corresponding to the multifunction peripheral 300-2, which is a transmission destination of the deletion notification, from a predetermined storage unit.

An apparatus determination unit 4014 determines whether the multifunction peripheral 300-3 is an image forming apparatus managing a list of image forming apparatuses in which print data is stored. When it is determined that the multifunction peripheral 300-2 is an image forming apparatus managing a list of image forming apparatuses, the image forming apparatus list reception unit 4005 acquires the list of image forming apparatuses from the multifunction peripheral 300-2.

An image forming apparatus information reception unit 4015 receives identification information from the multifunction peripheral 300-1.

A storage control unit 4016 performs a storage control of the received identification information with respect to a predetermined storage unit. In addition, the storage control unit 4016 may perform a storage control with respect to each of user identification information.

An image forming apparatus information request reception unit 4017 receives a request for the list (device list) of image forming apparatuses being a print data storage destination from an external image forming apparatus.

An apparatus list (device list) transmission unit 4018 sends a response indicating a device list including an image forming apparatus being a storage destination of print data printable at an image forming apparatus of a requestor, according to the above-described request. A device list including information of an image forming apparatus identified with the identification information stored by the storage control unit 4016 is sent as a response. The apparatus list transmission unit 4018 also transmits a list according to user identification information of a user logged into the image forming apparatus of the requestor.

A deletion notification reception unit 4019 receives the deletion notification of the identification information of the multifunction peripheral 300-1 from the multifunction peripheral 300-2.

A deletion unit 4020 deletes the identification information of the multifunction peripheral 300-1 being a notification source of the deletion notification from a predetermined storage unit according to the deletion notification.

An apparatus information deletion unit 4021 deletes the identification information of the multifunction peripheral 300-2, to which the deletion notification has been made, from a predetermined storage unit according to the deletion notification.

Next, an overview of processing by a printing system according to an exemplary embodiment will be described with reference to FIG. 19.

FIG. 19 illustrates a processing overview of receiving print data from the client PC 200 and notifying name information, acquiring a print data list after logging in to a multifunction peripheral, and printing and deleting the listed print data.

First, receiving print data and notifying name information will be described.

(1) Initially, after print data is generated using the printer driver on the client PC 200, the print data is transmitted to the multifunction peripheral 300-1 that is designated in advance in the printer driver as a transmission destination.

(2) The multifunction peripheral 300-1 receives the print data and analyzes print setting information (bibliographic information) including a header of the print data. A model name of a printer driver used to generate the print data is also received from the client PC 200, and the bibliographic information extracted from the header of the print data is added. Then, a bibliographic information file, as illustrated in FIG. 14, is stored in the HDD 304 of the multifunction peripheral 300-1.

(3) After the extraction of the bibliographic information, the print data received from the client PC 200 is stored in the HDD 304 of the multifunction peripheral 300-1.

(4) After receiving the print data from the client PC 200, the multifunction peripheral 300-1 provides name information, including information from the bibliographic information file such as the user name of the user who generated the print data, a model name, and the host name (name information) of the multifunction peripheral 300-1 (storage destination of the print data), to the multifunction peripheral 300-2 having a name service function (function that manages host names corresponding to image forming apparatuses that store print date) that has been preliminarily registered in the HDD 304 of multifunction peripheral 300-1.

(5) The multifunction peripheral 300-2 stores the received name information in the HDD 304 as a name information file, as illustrated in FIG. 16.

Next, acquiring the print data list after login of a user will be described.

(6) The multifunction peripheral 300-3 receives a user login notification from an authentication program and acquires user login information. (7) The multifunction peripheral 300-3 transmits a name information acquisition request, including a user name contained in the user login information and the multifunction peripheral's model name, to the multifunction peripheral 300-2. Device information (IP address, host name (devices including a name service function), or the like) of the multifunction peripheral 300-2, which is used by the multifunction peripheral 300-3 to transmit the name information acquisition request, is pre-stored in the multifunction peripheral 300-3.

(8) The multifunction peripheral 300-2 searches for a host name (storage destination) contained in a name information file that matches the user name, the model name, and the file name contained in the received name information acquisition request. (9) The host name (storage destination) associated with the search results is provided back to the multifunction peripheral 300-3. The user name and the type of multifunction peripheral may be used to search name information files. Just the user name can be used to search the name information files when multifunction peripherals print incoming print data in a network system. For example, if the multifunction peripherals are able to process XPS print data, the type of multifunction peripheral may not be needed, but instead, the user information can be used to search for name information files.

For example, the multifunction peripheral of the present exemplary embodiment may interpret a general-purpose format such as XPS data (XPS: XML Paper Specification). Rendering processing is possible by receiving XPS data from the printer driver and interpreting XPS data in the multifunction peripheral. Therefore, any model can perform printing as long as it can interpret XPS data.

(10) The multifunction peripheral 300-3 transmits a bibliographic information acquisition request, including the user name of the user logged into the multifunction peripheral 300-3 and its model name, with respect to the received host name (storage destination). When a plurality of host names (storage destinations) are contained in the name information received from the multifunction peripheral 300-2, the bibliographic information acquisition request is transmitted with respect to all host names (storage destinations), including that of the multifunction peripheral 300-3.

(11) The multifunction peripheral 300-1 searches bibliographic information for a user name that matches the user name associated with the received bibliographic information acquisition request. (12) The bibliographic information obtained as a result of the search is transmitted back to the multifunction peripheral 300-3. The bibliographic information can be configured to transmit necessary bibliographic information. For example, information capable of specifying the print data, such as the file name, is transmitted.

(13) The multifunction peripheral 300-3 stores the received bibliographic information in the RAM 302 and displays the list on the operation unit 308. When the bibliographic information is received from a plurality of host names (storage destinations), all pieces of the bibliographic information are merged and listed.

Next, receiving a print instruction from a user and printing print data will be described.

(14-1) When a user selects the listed bibliographic information and then selects the start printing button 1303, the multifunction peripheral 300-3 generates a print request and transmits the print request, including a file name, with respect to a host name (storage destination) of the selected bibliographic information. If the host name matches a host name of a multifunction peripheral that is requested to print the print data, the print data is obtained from the multifunction peripheral that is requested to print the print data.

(15-1) The multifunction peripheral 300-1 acquires the print data from the file name contained in the print request from the multifunction peripheral's 300-1 HDD 304. (16-1) The acquired print data is transmitted to the multifunction peripheral 300-3. (17-1) The multifunction peripheral 300-3 then prints the received print data.

Next, receiving a deletion instruction from a user and deleting name information will be described.

(14-2) When a user selects the listed bibliographic information (print data) and selects the Delete button 1302, the multifunction peripheral 300-3 generates a deletion request and transmits the deletion request, including a file name, with respect to a host name (storage destination) of the selected print data. If the host name matches a host name of a multifunction peripheral that is requested to delete the print data, status 1401 of the bibliographic information corresponding to the selected print data is marked as deleted.

(15-2) The multifunction peripheral 300-1 changes a status 1401 to a deleted status in the bibliographic information file corresponding to the print data from the file name contained in the deletion request from the HDD 304 in the multifunction peripheral 300-1 with respect to the received deletion request. In addition, a configuration of deleting the bibliographic information and deleting the print data when the deletion request is received may also be taken.

(16-2) When the status 1401 of the user's printable data within the multifunction peripheral 300-1 is completely deleted, the multifunction peripheral 300-1 transmits a deletion notification of name information, including a user name, a model name, and a host name of the multifunction peripheral 300-1 to the multifunction peripheral 300-2. When even any printable data is present, the name information deletion notification is not transmitted. (17-2) The multifunction peripheral 300-2 deletes the corresponding host name from the name information file stored in the HDD 304, according to the corresponding name information contained in the received name information deletion notification.

Next, the processing of the exemplary embodiment will be described with reference to FIGS. 5 to 11 and FIG. 20.

The program and service described in the exemplary embodiment are installed as software in the multifunction peripherals.

The steps are executed by CPUs (CPU 201 and CPU 301) of the respective apparatuses (client PC 200 and multifunction peripherals 300-1, 300-2, and 300-3).

Figure 5:
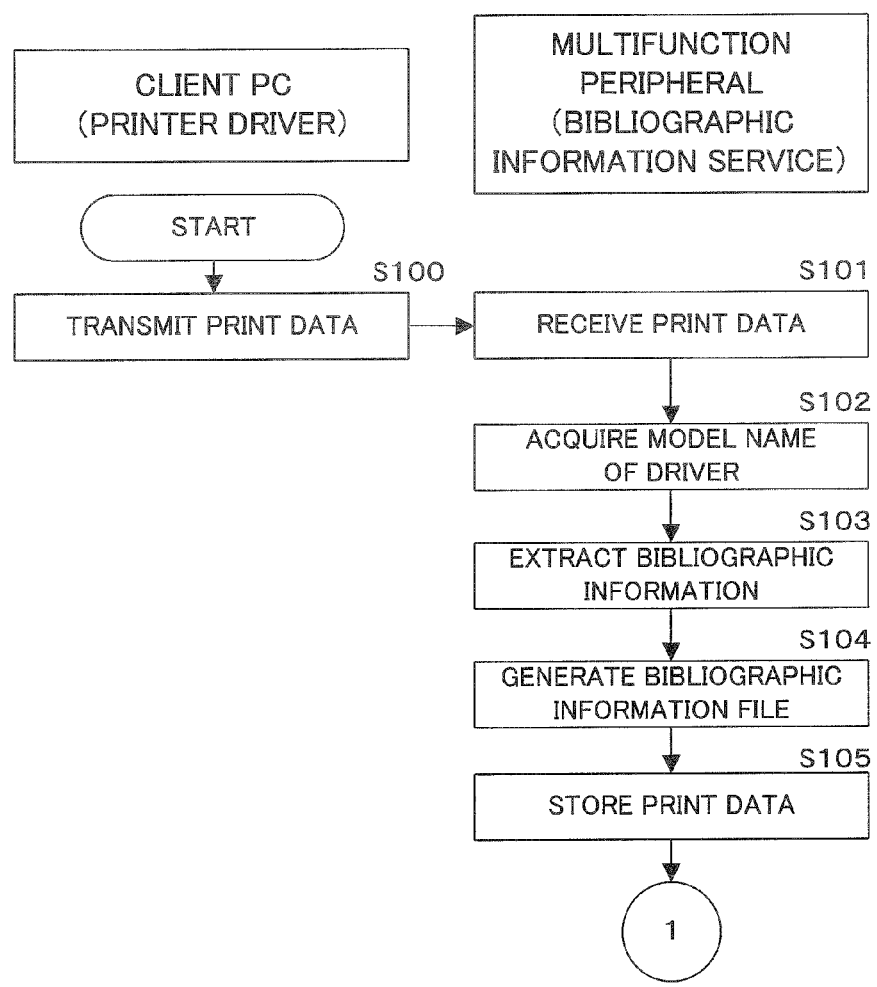
FIG. 5 is a flow chart of print data generation and reception.
Figure 6:
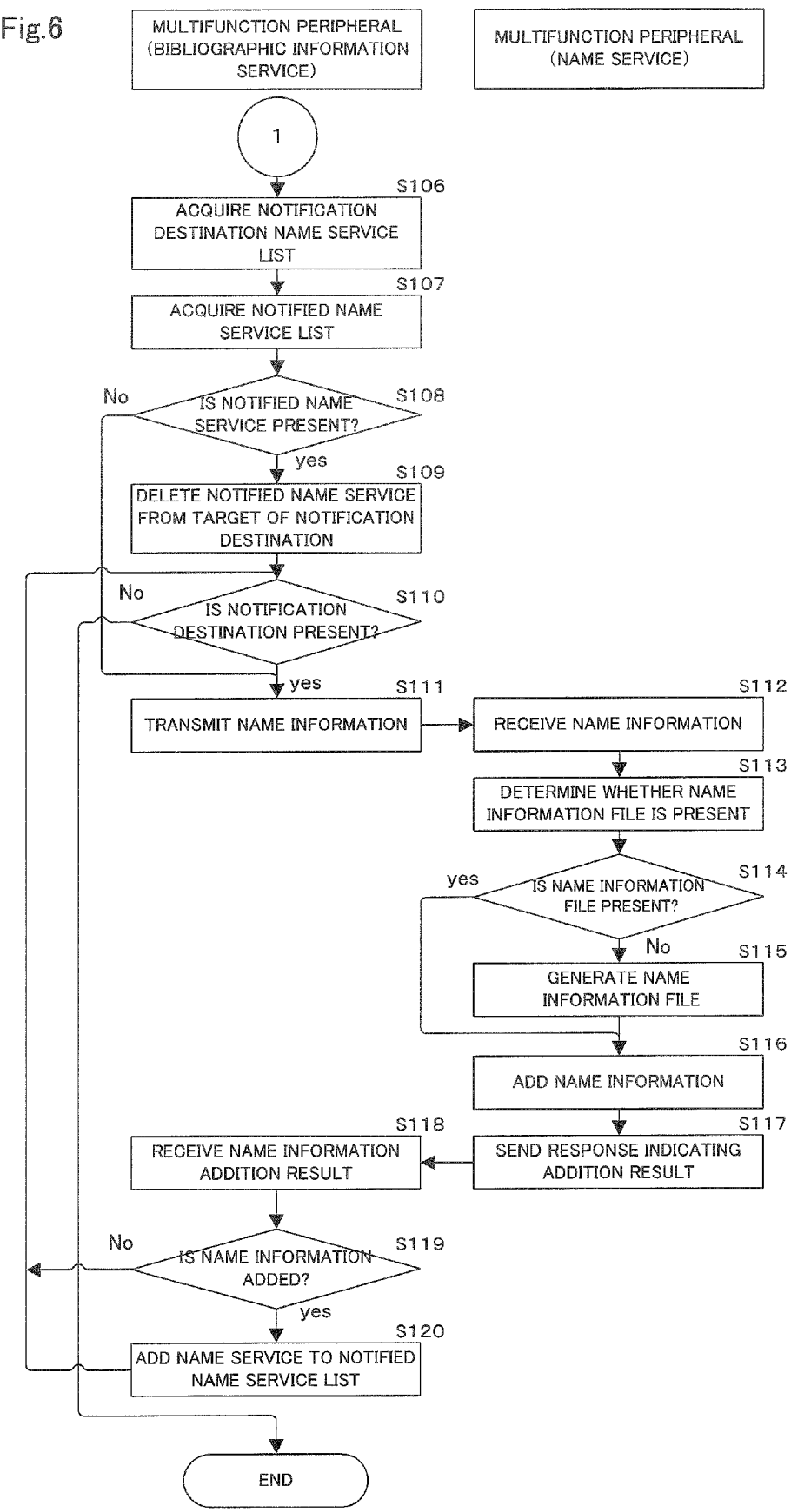
FIG. 6 is a flow chart of notification and registration of print data name information.

FIG. 5 is a flowchart of print data generation and reception according to the exemplary embodiment. FIG. 6 is a flow chart of notification and registration of print data name information according to the exemplary embodiment.

In step S100, the printer driver on the client PC 200 transmits the print data to the multifunction peripheral 300-1 according to the print instruction from the user.

In step S101, the bibliographic information service of the multifunction peripheral 300-1 monitors the print reception ports (LPR515 port or RAW9100 port) and acquires print data received at the print data reception ports, which is transmitted by the client PC 200 in step S100.

In step S102, the bibliographic information service of the multifunction peripheral 300-1 acquires the model name of the printer driver (for example, MFP5050), which is used to generate the print data at the client PC 200, from the acquired print data. The acquired model name may be configured to be used to determine a model via which the generated print data can be output. For example, the same models are grouped and model information is managed by grouping in outputable group information. The outputting is enabled with respect to the models belonging to the same group.

In step S103, the bibliographic information service of the multifunction peripheral 300-1 extracts a variety of pieces of information (bibliographic information) of the print data, as illustrated in FIG. 14, which is contained in the header of the print data received from the client PC 200.

Steps S102 and S103 describe the processing of acquiring bibliographic information for managing the print data according to the reception of the print data.

In step S104, the bibliographic information service of the multifunction peripheral 300-1 generates the bibliographic information file, as illustrated in FIG. 14, based on the bibliographic information extracted in step S103, and stores the bibliographic information file in a predetermined directory of the multifunction peripheral 300-2.

FIG. 14 is a diagram illustrating an example of the bibliographic information file. The bibliographic information file is stored in the HDD 304.

The bibliographic information file includes print setting information 1403, such as a user name (user identification information) of a user who logs into the client PC 200 and generates the print data, a document name of the print data, a time stamp indicating a generation time of the print data, two-sided/single-sided, 2in1, and color/monochrome. The bibliographic information file also includes a model name 1405 of a printer driver used to generate the print data acquired from the client PC 200, a unique file name 1402 generated at the time of receiving the print data, a status 1401 indicating processing content of the print data, and a host name (storage destination of print data) 1404 of multifunction peripheral 300-1, and the like.

The bibliographic information may be any file format, if managed for each of the print data, and may be a database or a table.

In step S105, the bibliographic information service of the multifunction peripheral 300-1 stores the print data in a predetermined directory (HDD 304) of the multifunction peripheral 300-2. The print data is received, as the unique file name 1402 generated at the time of receiving the print data, from the client PC 200 after the generation of the bibliographic information file in step S104, Steps S104 and S105 describe the processing of storing the print data and the bibliographic information.

Next, in step S106, the bibliographic information service of the multifunction peripheral 300-1 acquires a notification destination name service list as illustrated in FIG. 6, which has been preliminarily registered, as illustrated in FIG. 17. The multifunction peripheral of the notification destination name service is the multifunction peripheral 300-2 in the system configuration diagram of FIG. 1.

FIG. 17 is a diagram illustrating an example of the name service notification destination. The name service notification destination is stored in the HDD 304.

In FIG. 17, IP addresses of the multifunction peripheral 300-2 operating as the name service are shown as the name service notification destination. The name service notification destination may be host names instead of the IP addresses.

In step S107, the bibliographic information service of the multifunction peripheral 300-1 acquires the notified name service list, as illustrated in FIG. 18.

FIG. 18 is a diagram illustrating an example of the notified name service list. The notified name service list is stored in the HDD 304.

The notified name service list is managed for each user name of users who log into the client PC 200 and generate the print data, and for each model name of the printer driver used to generate the print data. It includes the IP addresses of the multifunction peripheral that notified the name information in step S111. The notified name service list may include host names instead of the IP addresses.

When the same user generates the print data using the printer driver of the same model and receives the print data at the multifunction peripheral 300-1, unless the notification to the multifunction peripheral 300-2 of the previous name service fails, the same notification destination (IP address) as the notification destination name service list, illustrated in FIG. 17, which is acquired in step S106, is registered in the notified name service list. When the name service is deleted from the notified name service list in step S427, or when the notification fails, the notified name service list (FIG. 18) and the notification destination name service list (FIG. 17) are not matched with each other.

When the print data is generated for the first by the user or the print driver of the model is used for the first time, and the print data is received at the multifunction peripheral 300-1, the notified name service list is acquired as blank data. Even when the printable data is not present due to the deletion instruction from the user, and thus the deletion notification is performed correctly, the notified name service list is acquired as blank data.

In step S108, the bibliographic information service of the multifunction peripheral 300-1 determines whether the notified name service is registered in the notified name service list acquired in step S107. The bibliographic information service of the multifunction peripheral 300-2 proceeds to step S109 when it is determined that at least one notified name service is registered, and proceeds to step S111 when it is determined that no notified name service is registered.

In step S109, the bibliographic information service of the multifunction peripheral 300-1 deletes the name service, which is determined that at least one time is registered after notification in step S108, from the target of the notification destination name service, as illustrated in FIG. 17, which is acquired in step S106. That is, the name service notification destination of FIG. 17 is stored in the RAM 302, and the notified name service list of FIG. 18 is deleted from the name service notification destination stored in the RAM 302.

Therefore, with regard to the notified name service, it is determined that the name information is already notified and it is deleted from the notification target. Thus, unnecessary communication is prevented.

In step S110, the bibliographic information service of the multifunction peripheral 300-1 determines whether the name service of the notification destination is present in the RAM 302. The bibliographic information service of the multifunction peripheral 300-1 proceeds to step S111 when it is determined that any one name service of the notification destination is present, and the processing ends when it is determined that any name service of the notification destination is not present.

In step S111, the bibliographic information service of the multifunction peripheral 300-1 transmits the name information to the multifunction peripheral 300-2. The name information is stored in the RAM 302 when it is determined in step S110 that the notification destination is present. That is, in step S111, processing of transmitting the image forming apparatus information identifying the multifunction peripheral 300-1 to the multifunction peripheral 300-2, to notify that the print data is stored in the multifunction peripheral 300-1 is performed.

The transmitted name information includes the print data generation user name (i.e., user identification information) extracted in step S103, the model name of the printer driver used to generate the print data, and the IP address (host name) of multifunction peripheral 300-1 for identifying the storage destination of the print data.

When the notification destination is present in step S110 (e.g., when the first user performs a printing operation), the name information is transmitted to the multifunction peripheral 300-2 of the name service. Conversely, when the notification destination is not present in step S110 (i.e., when the same user performs the printing operation using the same model of the printer driver of the same model), the notification is already done. Therefore, the name information is not transmitted to the multifunction peripheral 300-2 of the name service, which reduces a communication load.

When the function of the bibliographic information server of the conventional printing system is provided in the multifunction peripheral 300-2, information (file name or the like) identifying the print data and information related to the print data, such as storage destination or the like, are transmitted to the multifunction peripheral 300-2 whenever receiving the print data. Therefore, when the conventional printing system is applied, the communication load is high. On the other hand, in an exemplary embodiment, in a printing system in which the communication is reduced and the print data is reserved in the multifunction peripheral, printing can be performed from a desired multifunction peripheral.

In step S112, the name service of the multifunction peripheral 300-2 receives the name information from the bibliographic information service of the multifunction peripheral 300-1 in step S111. That is, step S112 describes processing associated with receiving the image forming apparatus information from the multifunction peripheral 300-1.

In step S113, the name service of the multifunction peripheral 300-2 verifies whether the name information file, as illustrated in FIG. 16, is already generated, in which the name information file is managed by the user name of the user who generates the print data of the name information acquired in step S112, and the model name of the printer driver.

FIG. 16 is a diagram illustrating an example of the name information file.

In the name information file, the file name is configured by the user name of the user who generates the print data, and the model name of the printer driver. The IP address (host name) of the multifunction peripheral for identifying the storage destination of the print data of the received name information is stored in the file.

The file format of the name information file does not matter as long as the configuration of the file can be determined by the user name and the model name. For example, the name information file may be managed by a database or a table. In the case of different users or different model names, the name information files are generated with different file names.

In step S114, the name service of the multifunction peripheral 300-2 determines whether the name information file is present in step S113. The process proceeds to step S116 when it is determined that the name information file of the user name and the model name is already present, and proceeds to step S115 when it is determined that the name information file of the user name and the model name is not present.

In step S115, the name service of the multifunction peripheral 300-2 generates the file name from the user name and the model name, and newly generates the name information file as illustrated in FIG. 16. That is, the image forming apparatus information is stored for each user identification information.

In step S116, the name service of the multifunction peripheral 300-2 adds the IP address (host name) to the final row of the name information file determined as being present in step S114, or the name information file newly generated in step S115, so as to identify the storage destination of the print data received in step S112. That is, step S116 describes the process of storing the image forming apparatus information.

In step S117, the name service of the multifunction peripheral 300-2 sends a response indicating the name information addition result of step S116 to the bibliographic information service of the multifunction peripheral 300-1.

In step S118, the bibliographic information service of the multifunction peripheral 300-1 receives the addition result response of the name service of the multifunction peripheral 300-2 of step S117.

In step S119, according to the addition response result received in step S118, the bibliographic information service of the multifunction peripheral 300-1 proceeds to step S120 when it is determined that the name information is correctly added. The bibliographic information service proceeds to step S110 when it is determined that the name information addition has failed.

In step S120, the bibliographic information service of the multifunction peripheral 300-1 adds the corresponding notification destination name service (IP address of the multifunction peripheral 300-2) to the notified name service list as illustrated in FIG. 18, when it is determined in step S119 that the name information is correctly added, and then returns to step S110. In step S110, the processing ends when it is determined that the name information notification has completed with respect to all notification destination name services. That is, step S120 describes the process of storing the information on the multifunction peripheral 300-2 transmitting the image forming apparatus information as the multifunction peripheral 300-2 that the multifunction peripheral 300-1 has transmitted. The information on the multifunction peripheral 3002 (The transmitted information) is illustrated in FIG. 18.

Steps S106 to S111 describe the process of transmitting the image forming apparatus information identifying the multifunction peripheral 300-1 to the multifunction peripheral 300-2 when the image forming apparatus information identifying the multifunction peripheral 300-1 is not previously transmitted to multifunction peripheral 300-2. And Steps S106 to S111 describe the process of not transmitting the image forming apparatus information identifying the multifunction peripheral 300-1 to the transmitted multifunction peripheral 300-2 when the image forming apparatus information identifying the multifunction peripheral 300-1 is previously transmitted to multifunction peripheral 300-2. This prevents redundant transmission of information.

Figure 7:
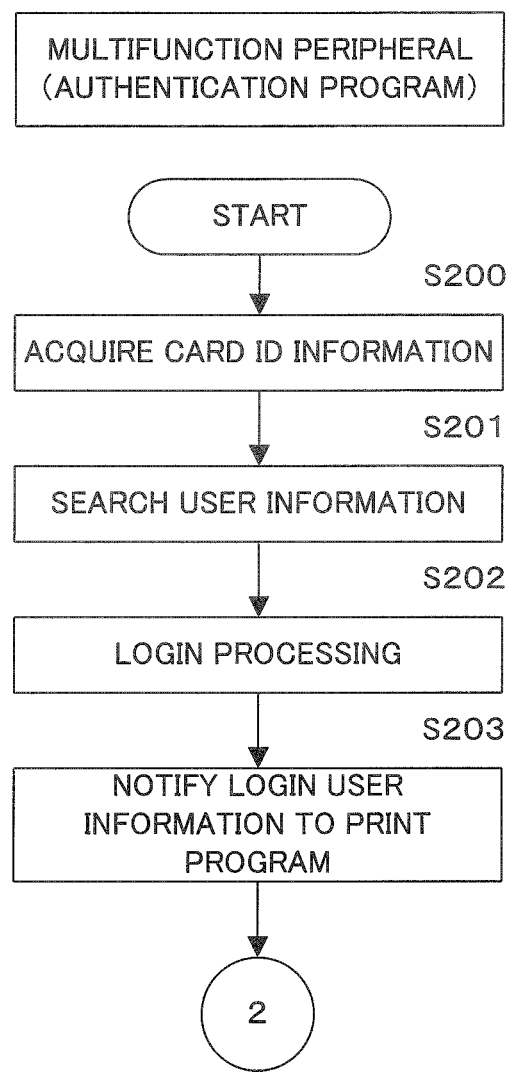
FIG. 7 is a flow chart of authentication processing.
Figure 8:
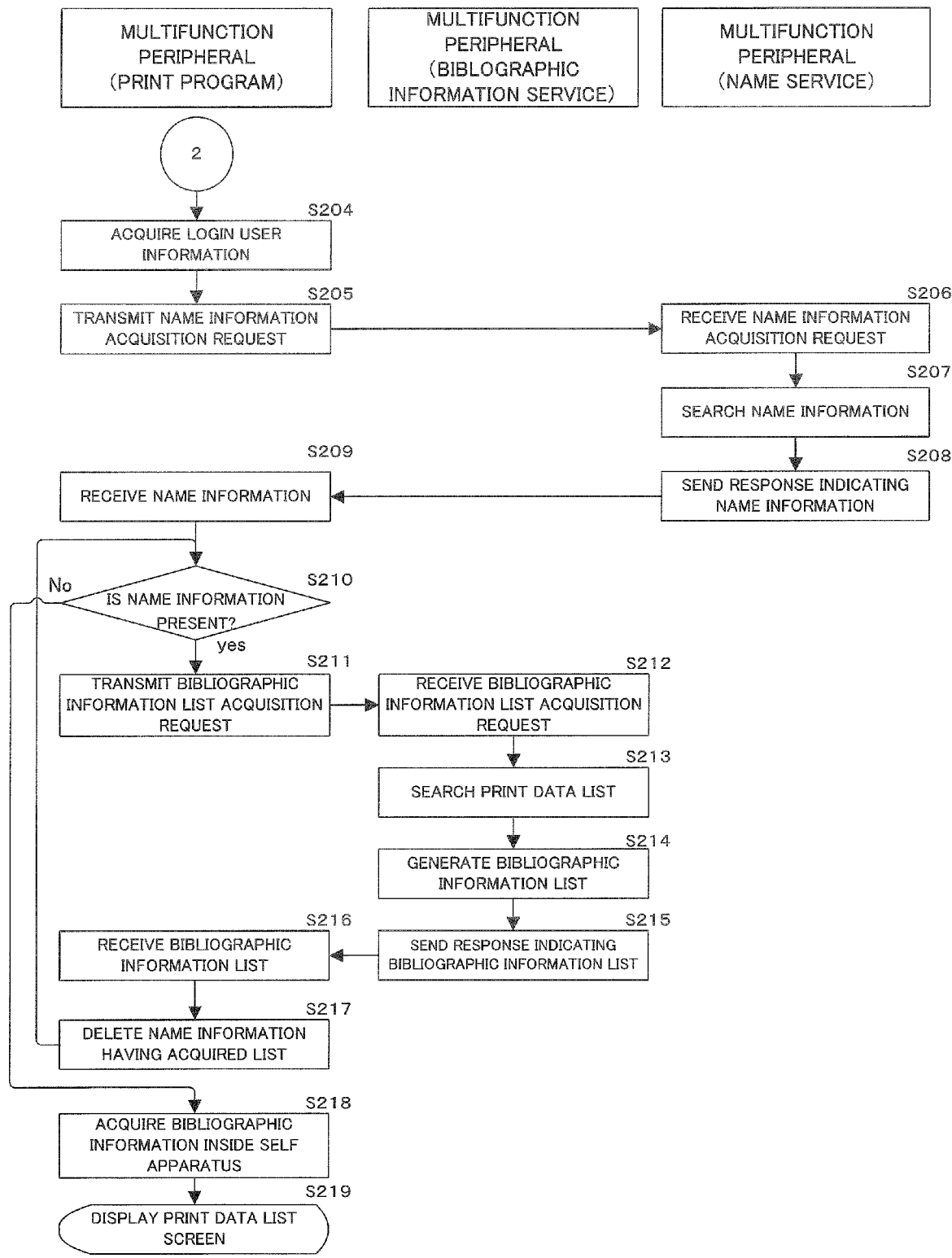
FIG. 8 is a flow chart of a name information acquisition and list acquisition processing.

FIG. 7 is a flow chart of an authentication processing according to the exemplary embodiment. FIG. 8 is a flow chart of a name information acquisition and list acquisition processing according to the exemplary embodiment.

Figure 12:
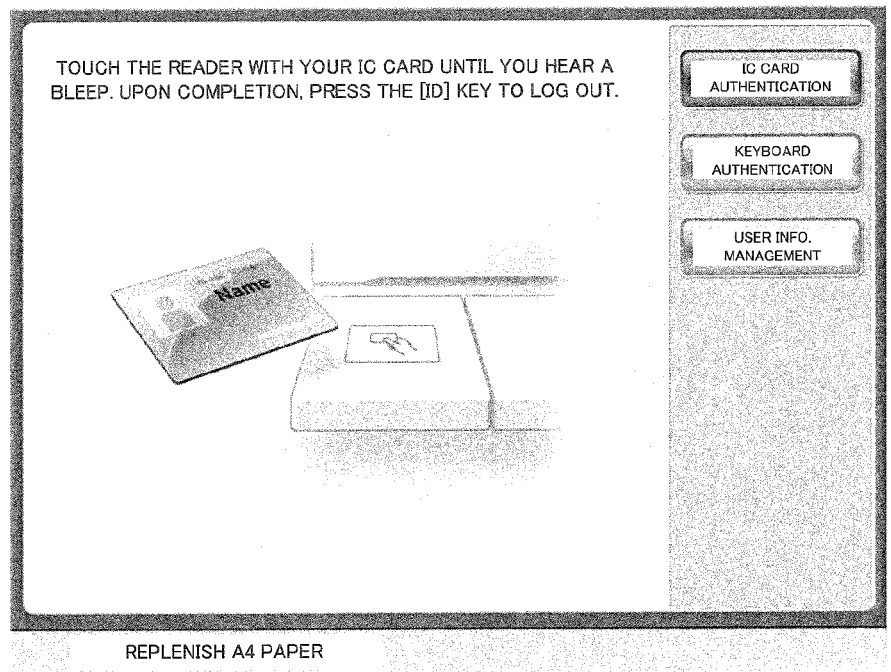
FIG. 12 is a diagram illustrating an example of an authentication screen.

In step S200, an authentication program of the multifunction peripheral 300-3 displays a screen as illustrated in FIG. 12 on the operation unit 308, and acquires card ID information from an IC card in the card reader 319.

FIG. 12 is a diagram illustrating an example of an authentication screen. The authentication screen is a screen displayed during IC card authentication.

The authentication screen is stored in the HDD 304.

While the authentication screen in the present exemplary embodiment is displayed during IC card authentication, in another exemplary embodiment, it can be displayed for authentication via keyboard entry. In the case of keyboard authentication, a soft keyboard is displayed on the operation unit 308 so that a user name and a password can be input.

In step S201, the authentication program of the multifunction peripheral 300-3 acquires user information (user name or the like), which is included in the card ID acquired in step S200, from a pre-stored user information table as illustrated in FIG. 15. In the exemplary embodiment, although the user information table is stored in the HDD 304 of the multifunction peripheral 300-3, the user information may be acquired by transmitting an IC card authentication request command including the card ID to an authentication server managing the card ID and the user information in association.

FIG. 15 is a diagram illustrating an example of the user information table.

The user information table manages a user name, an e-mail address, and a card ID corresponding to each respective user, and user information of multiple users are stored therein. The information included in the user information table is not limited to the user name, the e-mail address, and the card ID, and may include authority information for using a multifunction peripheral or the like therein.

In step S202, the authentication program of the multifunction peripheral 300-3 performs a login processing (use permission) to the multifunction peripheral 300-3 based on the user information acquired in step S201.

In step S203, the authentication program provides the login user information to the print program of the multifunction peripheral 300-3.

In step S204, the print program acquires the login user information provided by the authentication program in step S203.

In step S205, the print program transmits a request to acquire the login user name information (print data storage destination information) to a default multifunction peripheral, e.g., the multifunction peripheral 300-2 of the pre-stored name service, based on the login user information acquired in step S204 and the pre-acquired model name of multifunction peripheral 300-3 (e.g., MFP5050). If there are communication issues with the default multifunction peripheral, the acquisition request sent to another multifunction peripheral. That is, step S205 describes requesting the image forming apparatus information being the print data storage destination from the multifunction peripheral 300-2.

Step S205 is described in more detail with reference to FIG. 20.

Figure 20:
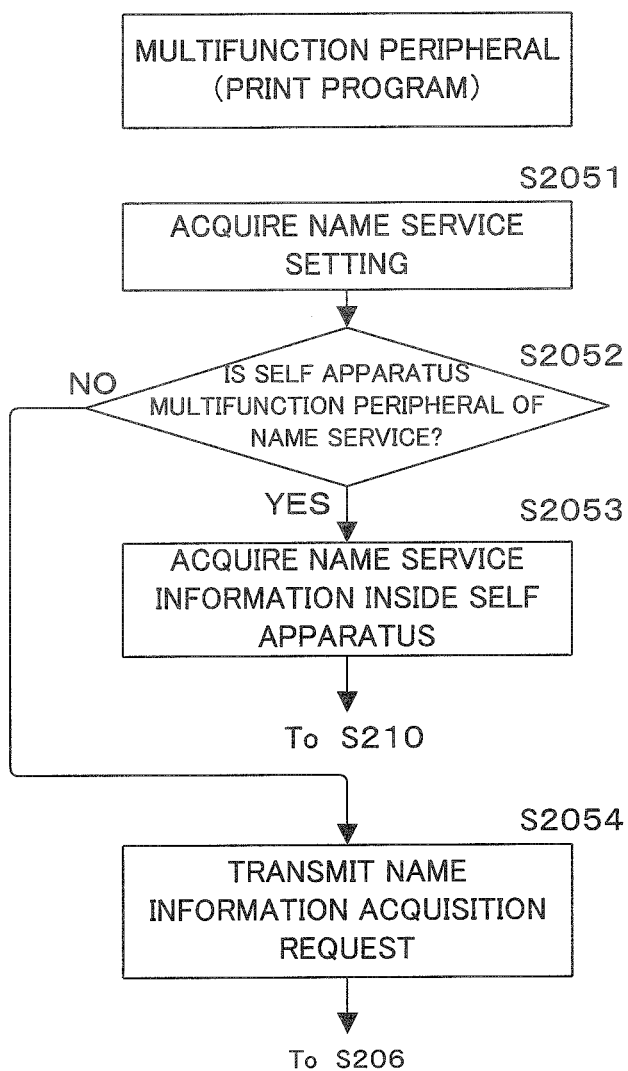
FIG. 20 is a flow chart of detailed processing of step S205.

FIG. 20 is a flow chart illustrating determining the multifunction peripheral of the name service being the inquiry destination of the name information (print data storage destination information) according to the exemplary embodiment.

In step S2051, the print program of the multifunction peripheral 300-3 acquires setting information for determining the multifunction peripheral of the preset name service as illustrated in FIG. 17. Further detailed setting information of FIG. 17 is illustrated in FIG. 21 and will be described herein with reference to FIG. 21.

In step S2052, it is determined whether multifunction peripheral 300-3 operates as the multifunction peripheral of the name service. The determination whether multifunction peripheral 300-3 operates as the multifunction peripheral of the name service is performed to determine whether the multifunction peripheral of the primary name service (name service 1) illustrated in FIG. 17 is identical to the IP address of multifunction peripheral 300-3. The determination whether multifunction peripheral 300-3 operates as the multifunction peripheral of the name service can be performed by determining whether a communication port for operating as the name service is opened within multifunction peripheral 300-3. It can also be determined whether multifunction peripheral 300-3 operates as the multifunction peripheral of the name service by the ON/OFF status of the name service setting. In the case where the setting is "ON", multifunction peripheral 300-3 is the name service. In the case where the setting is "OFF", multifunction peripheral 300-3 is not the name service.

The print program of the multifunction peripheral 300-3 proceeds to step S2053 when multifunction peripheral 300-3 is determined to be set as the multifunction peripheral of the name service, based on the name service setting acquired in step S2051. The print program proceeds to step S2054 when multifunction peripheral 300-3 is determined not to be the multifunction peripheral of the name service.

The determination whether multifunction peripheral 300-3 is the name service may prevent unnecessary communication and lead to a reduction in a communication load.

In step S2053, when multifunction peripheral 300-3 is determined to be the multifunction peripheral of the name service in step S2052, the print program of the multifunction peripheral 300-3 acquires the name information (print data storage destination information) pre-stored in multifunction peripheral 300-3, based on the login user information acquired in step S204 and the pre-acquired model name of multifunction peripheral 300-3 (e.g., MFP5050).

In step S2054, as described above with respect to step S205, the print program of the multifunction peripheral 300-3 transmits the acquisition request for the login user name information (print data storage destination information) to the default multifunction peripheral making the acquisition request of the name service according to the setting information for determining the multifunction peripheral of the name service acquired in step S2051, based on the login user information acquired in step S204 and the pre-acquired model name of multifunction peripheral 300-3 (e.g., MFP5050). If there are communication issues with the default multifunction peripheral, the acquisition request is sent to another multifunction peripheral.

In step S111, when the name information is notified, the name information is notified to the name services 1 to 10 illustrated in FIG. 17. However, at the time of the name information acquisition request in step S2054, the name information is notified to the name service 1.

In step S206, the name service of the multifunction peripheral 300-2 receives the name information acquisition request transmitted from the print program of the multifunction peripheral 300-3 in step S205. That is, step S206 describes receiving the image forming apparatus information request from the multifunction peripheral 300-3.

In step S207, the name service of the multifunction peripheral 300-2 determines whether the name information file as illustrated in FIG. 16 is present, based on the user name and the model name contained in the name information acquisition request received in step S206, and searches the user's name information (print data storage destination information).

More specifically, in order to acquire storage destination information of the user's print job printable at the multifunction peripheral where the print program of the multifunction peripheral 300-3 of the requestor is running, the name information file as illustrated in FIG. 16 is searched based on the user name and the model name contained in the name information acquisition request received in step S206. The file name of the name information file includes the user name and the model name, and the name information file is searched by comparing the file name with the user name and the model name contained in the name information acquisition request. Although the model name is used in the exemplary embodiment, there is a printable case even though the model is different. Therefore, it may be a printer group representing a printer arrangement being a printable printer group.

The information of the name information file illustrated in FIG. 16 may be managed by a database instead of as separate files.

The name information (host name) of the multifunction peripheral, which is stored in the searched name information file, is acquired.

In step S208, the name service of the multifunction peripheral 300-2 sends a response indicating the name information (print data storage destination information) searched in step S207 to the print program of the multifunction peripheral 300-3. That is, the list of the image forming apparatus information being the storage destination of the print data printable at the multifunction peripheral 300-3 is transmitted to the multifunction peripheral 300-3 according to the image forming apparatus information request. Step S208 describes processing of transmitting the image forming apparatus information list according to the user identification information of the user logging in to the multifunction peripheral 300-3.

In step S209, the print program of the multifunction peripheral 300-3 receives the name information transmitted by the name service of the multifunction peripheral 300-2 in step S208. The received name information is stored in the RAM 302. That is, step S209 describes receiving the image forming apparatus information list being the print destination from the multifunction peripheral 300-2.

In step S210, a determination is made whether the print data storage destination of the login user, except for multifunction peripheral 300-3, is present in the name information received in step S209. If it is present, the print program of the multifunction peripheral 300-3 proceeds to step S211. If it is not present, the print program proceeds to step S218. The determination is made by comparing the IP address information of the print data storage destination acquired in step S209 with the IP address of multifunction peripheral 300-3 previously acquired in response to activation of an application. If it is determined that addresses other than the IP address of multifunction peripheral 300-3 are contained in the IP address information acquired from the name service of the multifunction peripheral 300-2, the print program proceeds to step S211. The print program proceeds to step S218 when it is determined that the IP address, except for multifunction peripheral 300-3, is not included.

In step S211, the print program transmits the bibliographic information list acquisition request, including the model name of the login user name and the model name of multifunction peripheral 300-3, to the multifunction peripheral 300-1 being the bibliographic information service corresponding to the print data storage destination. That is, step S211 describes requesting the print data list to each image forming apparatus corresponding to the received image forming apparatus information.

In step S212, the bibliographic information service of the multifunction peripheral 300-1 receives the bibliographic information list acquisition request transmitted by the print program of the multifunction peripheral 300-3 in step S211.

In step S213, the bibliographic information service of the multifunction peripheral 300-1 searches the bibliographic information file corresponding to the received user and model name, as illustrated in FIG. 14, according to the bibliographic information list acquisition request, including the user name and the model name received in step S212.

In step S214, the bibliographic information service of the multifunction peripheral 300-1 generates the bibliographic information list with the bibliographic information searched in step S213.

In step S215, the bibliographic information service of the multifunction peripheral 300-1 transmits the bibliographic information list generated in step S214 to the print program of the multifunction peripheral 300-3. That is, step S215 describes receiving the image forming apparatus information list being the print data storage destination from the multifunction peripheral 300-2.

In step S216, the print program of the multifunction peripheral 300-3 acquires the bibliographic information list transmitted by the bibliographic information service of the multifunction peripheral 300-1 in step S215. That is, step S216 describes receiving the print data list from each requested image forming apparatus.

In step S217, the print program of the multifunction peripheral 300-3 deletes the print data storage destination having received the bibliographic information list from the name information stored in the RAM 302 as the received status, and returns to step S210. In step S210, when a print data storage destination that does not acquire the bibliographic information is present within the name information, steps S211 to S217 are repeated.

In step S218, the print program of the multifunction peripheral 300-3 acquires the bibliographic information of the user who has logged into the multifunction peripheral 300-3. That is, step S218 describes the print program of the multifunction peripheral 300-3 requesting the print data list from the memory (HDD 304) of the multifunction peripheral 300-3.

In step S219, the print program of the multifunction peripheral 300-3 merges the bibliographic information acquired in steps S217 and S219, and displays a print data list screen as illustrated in FIG. 13.

FIG. 13 is a diagram illustrating an example of the print data list screen. The print data list screen is stored in the HDD 304.

The print data list screen displays the merged bibliographic information list as the print data list in a field 1301. The print data is selectable.

The print data list screen includes a Delete button 1302 and a print start button 1303, and is configured to enable the deletion or the print start (print instruction) of the print data selected in 1301.

Figure 9:
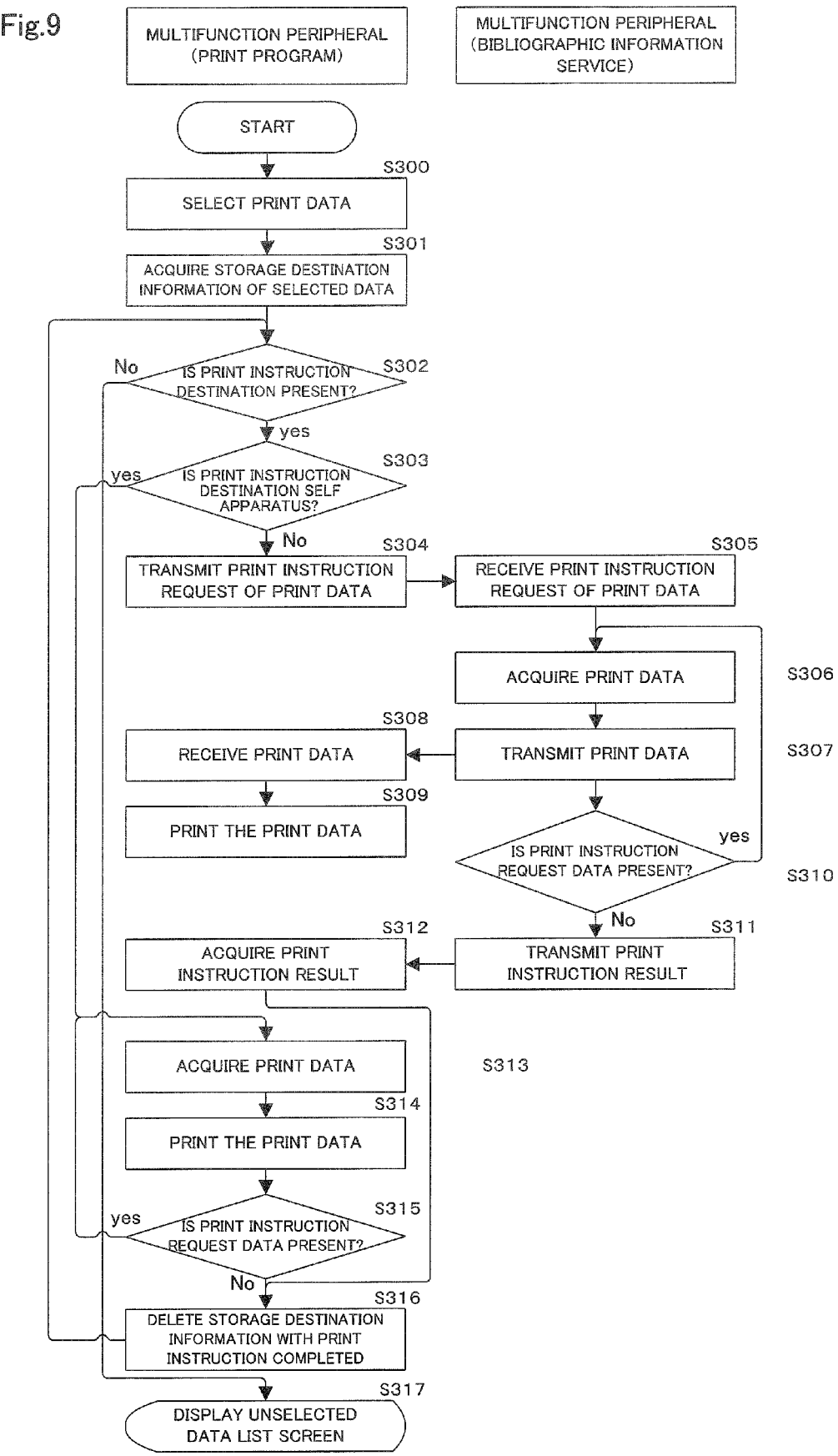
FIG. 9 is a flow chart of a print instruction and print data transmission processing.

FIG. 9 is a flow chart of a print instruction and print data transmission processing according to the exemplary embodiment.

In step S300, a user logging into the multifunction peripheral 300-3 selects arbitrary print data 1301 from the print data list screen, as illustrated in FIG. 13, which is displayed by the print program of the multifunction peripheral 300-3 in step S219. Next, the pressing of the Start Printing button 1303 is received, and the printing of the selected print data is instructed.

In step S301, the print program of the multifunction peripheral 300-3 receives the print instruction and arbitrary print data 1301, and acquires a host name (storage destination) 1404, which is contained in the selected print data bibliographic information, from the bibliographic information list acquired in step S126.

In step S302, a determination is made whether host name (storage destination) of the print instruction destination acquired in step S301 is present. The print program of the multifunction peripheral 300-3 proceeds to step S303 when it is determined that the host name (storage destination) information of the print instruction destination acquired in step S301 is present. The print program proceeds to step S317 when it is determined that the print instruction destination is not present.

In step S303, the print program of the multifunction peripheral 300-3 determines whether the print instruction destination of the selected print data is present in the multifunction peripheral 300-3. The processing proceeds to step S314 when it is determined that the print instruction destination of the selected print data is present in the multifunction peripheral 300-3, and proceeds to step S304 when it is determined that the print instruction destination of the selected print data is not present in the multifunction peripheral 300-3.

In step S304, when it is determined that the print instruction destination of the print data of the bibliographic information selected in step S303 is not present in the multifunction peripheral 300-3, the print program of the multifunction peripheral 300-3 transmits the print instruction request, including the file name 1402 in the bibliographic information of the selected print data, according to the host name (storage destination) acquired in step S301. When the plurality of print data files stored in the same host name (storage destination) is selected in step S301, the print instruction request including the file names of all the corresponding print data is transmitted. That is, step S304 describes making a print request to the image forming apparatus corresponding to the received image forming apparatus information. Step S304 also describes making a print request to the image forming apparatus in which the print data selected in the print data list is stored. This can result in reducing the communication load.

In step S305, the bibliographic information service of the multifunction peripheral 300-1 receives the print instruction request transmitted by the print program of the multifunction peripheral 300-3 in step S304.

In step S306, the bibliographic information service of the multifunction peripheral 300-1 acquires the corresponding print data from the HDD 304, based on the file name contained in the print instruction request received in step S305.

In step S307, the bibliographic information service of the multifunction peripheral 300-1 transmits the print data acquired in step S306 to the multifunction peripheral 300-3 using, for example, the FTP protocol.

In step S308, the print program of the multifunction peripheral 300-3 receives the print data transmitted by the bibliographic information service of the multifunction peripheral 300-1 in step S307.

In step S309, the print program of the multifunction peripheral 300-3 prints the print data received in step S308.

In step S310, a determination is made whether the print data, which is still not transmitted to the multifunction peripheral 300-3, is present among the file names contained in the print instruction request received in step S305. If it is determined that the print data is present, the bibliographic information service of the multifunction peripheral 300-1 proceeds to step S306 and repeats the processing of steps S306 to S310 while the print data, is present. If it is determined that the print data is not present, the processing proceeds to step S311.

In step S311, the bibliographic information service of the multifunction peripheral 300-1 transmits a print instruction result, including the file name, to the print program of the multifunction peripheral 300-3.

In step S312, the print program of the multifunction peripheral 300-3 receives the print instruction result transmitted by the bibliographic information service of the multifunction peripheral 300-1 in step S311, and proceeds to step S316.

In step S313, the print program of the multifunction peripheral 300-3 acquires the print data, which corresponds to the file name 1402 contained in the bibliographic information of the print data selected by the user in step S300, and which is stored in the multifunction peripheral 300-3 itself. That is, step S313 describes acquiring the print data from the multifunction peripheral 300-3 when the print data selected in the print data list is stored in the multifunction peripheral 300-3.

In step S314, the print program of the multifunction peripheral 300-3 prints the print data acquired in step S313. That is, step S314 describes printing the received print data according to the print request.

In step S315, a determination is made whether the print data, which is still not printed, is present in the multifunction peripheral 300-3 within the print data selected in step S300. If the print data is present, the print program of the multifunction peripheral 300-3 proceeds to step S313 and repeats the processing of steps S313 to S315 while the print data is present. If the print data is not present, the processing proceeds to step S316.

In step S316, the print program of the multifunction peripheral 300-3 deletes the multifunction peripheral having acquired the print instruction result in step S312, in which the print instruction has been completed insteps S313 to S315, from the storage destination information acquired in step S301 (i.e., excludes the destination information from the target of the print instruction destination with or without deletion. For example, the print instruction destination may be marked as inactive without deletion), and returns to step S302. Steps S303 to S316 are repeated if it is determined in step S302 that the print instruction destination is present. The processing proceeds to step S317 if it is determined that the print instruction destination is not present.

In step S317, the print program of the multifunction peripheral 300-3 displays the print data list screen of the unselected print data that is not selected from the user in step S300.

Figure 10:
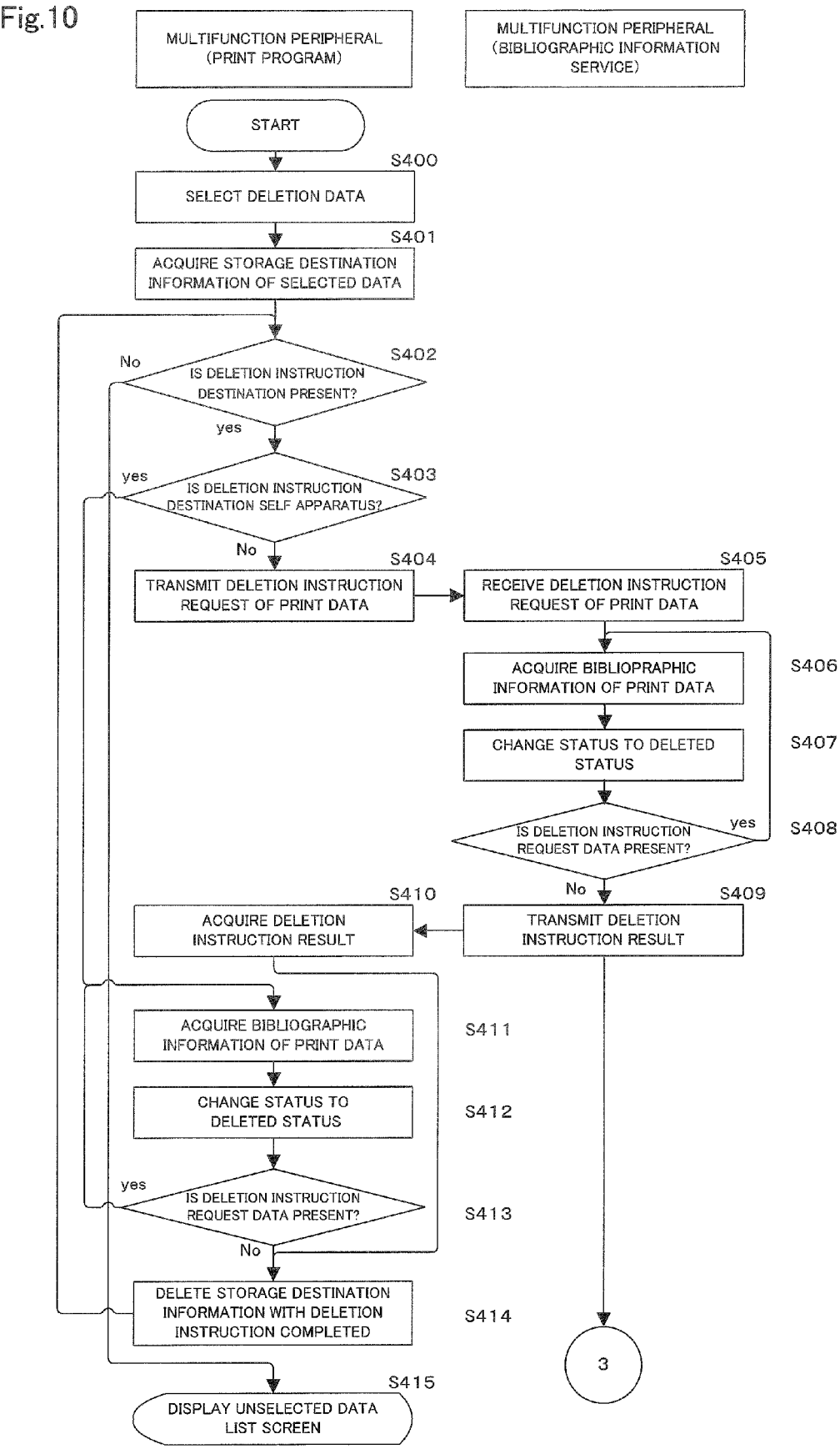
FIG. 10 is a flow chart of a deletion instruction.
Figure 11:
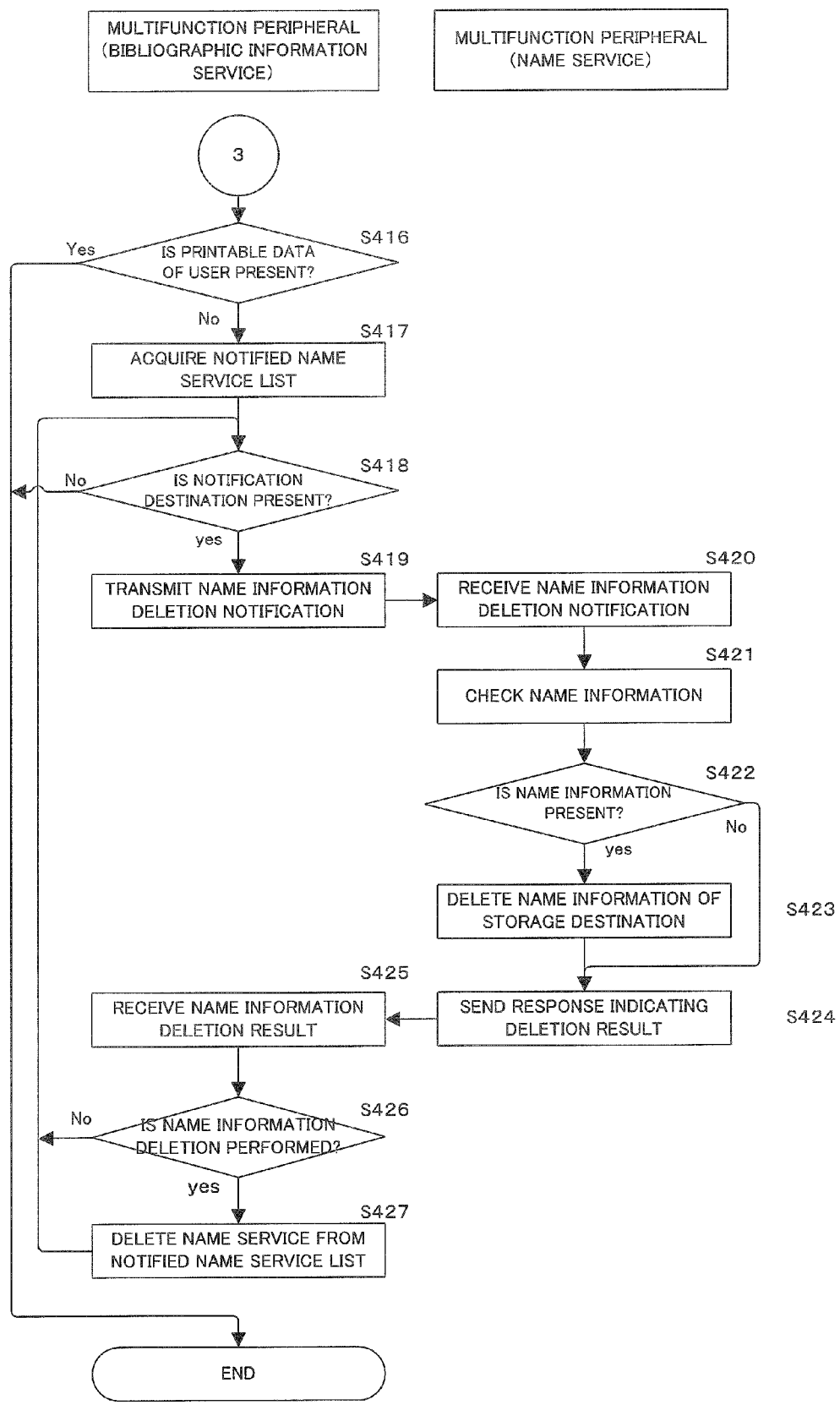
FIG. 11 is a flow chart of name information deletion processing.

FIG. 10 is a flow chart of a deletion instruction according to the exemplary embodiment. FIG. 11 is a flowchart of a name information deletion process according to the exemplary embodiment.

In step S400, a user logging into the multifunction peripheral 300-3 selects arbitrary print data 1301 from the print data list screen, as illustrated in FIG. 13, which is displayed by the print program of the multifunction peripheral 300-3 in step S219 or S317. Next, the Delete button 1302 is selected, and deletion of the selected print data is instructed.

In step S401, the print program of the multifunction peripheral 300-3 receives the deletion request initiated by selection of the Delete button 1302, and acquires a host name (storage destination) 1404, which is contained in the selected print data bibliographic information, from the bibliographic information list received in step S126.

In step S402, a determination is made whether any one host name (storage destination) information of the deletion instruction destination is present. The print program of the multifunction peripheral 300-3 proceeds to step S403 if it is determined that any one host name (storage destination) information of the deletion instruction destination is present. The print program proceeds to step S415 if it is determined that the deletion instruction destination is not present.

In step S403, a determination is made whether the deletion instruction destination of the selected print data is present in the multifunction peripheral 300-3 If it is determined that the deletion instruction destination is present, the print program of the multifunction peripheral 300-3 proceeds to step S411.

If it is determined that the deletion instruction destination of the selected print data is present in the multifunction peripheral 300-3, The print program proceeds to step S404 if it is determined that the deletion instruction destination of the selected print data is not present in the multifunction peripheral 300-3.

In step S404, the print program of the multifunction peripheral 300-3 transmits the deletion instruction request, including the file name 1402 in the bibliographic information of the selected print data, according to the host name (storage destination) acquired in step S401. When the plurality of print data files stored in the same host name (storage destination) is selected in step S401, the deletion instruction request including the file names of all the corresponding print data is transmitted.

In step S405, the bibliographic information service of the multifunction peripheral 300-1 receives the deletion instruction request transmitted by the print program of the multifunction peripheral 300-3 in step S404.

In step S406, the bibliographic information service of the multifunction peripheral 300-1 acquires the bibliographic information file of the corresponding print data as illustrated in FIG. 14, based on the file name contained in the deletion instruction request received in step S405.

In step S407, the bibliographic information service of the multifunction peripheral 300-1 changes the status 1401 in the bibliographic information file to the deleted status. That is, step S407 describes changing the print data to the deleted status.

In step S408, a determination is made whether the deletion instruction request data is present. If it is determined that the print data, whose status 1401 in the bibliographic information file is still not changed to the deleted status, is present among the file names contained in the deletion instruction request received in step S405, the bibliographic information service of the multifunction peripheral 300-1 returns to step S406 and repeats the processing of steps S406 to S408 while the print data, whose status 1401 in the bibliographic information file is not still changed to the deleted status, is present. If it is determined that the print data is not present, the processing proceeds to step S409.

In step S409, the bibliographic information service of the multifunction peripheral 300-1 transmits a deletion instruction result to the print program of the multifunction peripheral 300-3, and proceeds to step S416.

In step S410, the print program of the multifunction peripheral 300-3 receives the deletion instruction result transmitted by the bibliographic information service of the multifunction peripheral 300-1 in step S409, and proceeds to step S414.

In step S411, the print program of the multifunction peripheral 300-3 acquires the bibliographic information file, which corresponds to the file name 1402 contained in the bibliographic information of the print data selected by the user in step S400, from the multifunction peripheral 300-3.

In step S412, the print program of the multifunction peripheral 300-3 changes the status 1401 in the bibliographic information file to the deleted state.

In step S413, a determination is made whether the deletion instruction request data is present. If it is determined that the print data, whose status 1401 in the bibliographic information file is still not changed to the deleted status, is present in the multifunction peripheral 300-3 within the print data selected in step S400, the print program of the multifunction peripheral 300-3 proceeds to step S411 and repeats the processing of steps S411 to S413 while the print data is present. If it is determined that the print data is not present, the processing proceeds to step S414.

In step S414, the print program of the multifunction peripheral 300-3 deletes the deletion instruction destination having acquired the deletion instruction result in step S410 and the self apparatus having been deleted in steps S411 to S413, from the storage destination information list acquired in step S401 (i.e., excludes the destination information from the target of the print instruction destination with or without deletion. For example, the print instruction destination may be marked as inactive without deletion), and returns to step S402. Steps S403 to S413 are repeated if it is determined in step S402 that the deletion instruction destination is present, and the processing proceeds to step S415 if it is determined that the deletion instruction destination is not present.

In step S415, the print program of the multifunction peripheral 300-3 displays the print data list screen of the unselected print data which is not selected by the user in step S400.

In step S416, the bibliographic information service of the multifunction peripheral 300-1 determines whether the printable data of the user who is currently logged in is still present within the multifunction peripheral 300-1. The processing ends when it is determined that the printable data is still present, and the processing proceeds to step S417 when it is determined that the printable data of the user currently logged in is not present.

In step S417, the bibliographic information service of the multifunction peripheral 300-1 acquires the notified name service list as illustrated in FIG. 18.

In step S418, the bibliographic information service of the multifunction peripheral 300-1 determines whether the multifunction peripheral 300-2 of the name service notified as the print data storage destination of the user, to which the deletion instruction request has been made, is present. If it is determined that any one notified name service is present, the bibliographic information service of the multifunction peripheral 300-1 proceeds to step S419. If it is determined that any one notified name service is not present, the bibliographic information service of the multifunction peripheral 300-1 determines that the deletion notification is unnecessary, and the processing ends.

In step S419, the bibliographic information service of the multifunction peripheral 300-1 transmits the name information deletion notification to the name service (which corresponds to the multifunction peripheral 300-2 in the system configuration diagram of FIG. 1). The transmitted name information deletion notification transmitted includes the user name of the user who is currently logged in, the pre-acquired model name of multifunction peripheral 300-1, and the IP address (host name) of multifunction peripheral 300-1. That is, step S419 describes providing the print data deletion notification to the multifunction peripheral 300-2.

Steps S416 to S419 describes providing the deletion notification when the printable print data is not present in the multifunction peripheral 300-1.

In step S420, the name service of the multifunction peripheral 300-2 receives the name information deletion notification transmitted by the bibliographic information service of the multifunction peripheral 300-1 in step S419. That is, step S420 describes receiving the print data deletion notification from the multifunction peripheral 300-1.

In step S421, the name service of the multifunction peripheral 300-2 checks (searches) the name information file, as illustrated in FIG. 16, which corresponds to the user name and the model name contained in the name information deletion notification received in step S420.

In step S422, a determination is made whether the IP address (host name) of the storage destination contained in the name information deletion notification received in step S420 is present in the name information file checked in step S421. If it is present, the name service of the multifunction peripheral 300-2 proceeds to step S423, and if it is not present, proceeds to step S424.

In step S423, the name service of the multifunction peripheral 300-2 deletes the corresponding IP address (host name) from the name information file checked in step S421. That is, step S423 describes deleting the image forming apparatus information of the multifunction peripheral 300-1, where there is the deletion notification according to the deletion notification.

In step S424, and after the IP address of the storage destination is deleted in step S423, the name service of the multifunction peripheral 300-2 transmits the name information deletion result to the bibliographic information service of the multifunction peripheral 300-1.

In step S425, the bibliographic information service of the multifunction peripheral 300-1 receives the name information deletion result transmitted in step S424.

In step S426, a determination is made whether the name information deletion is performed correctly, based on the name information deletion result received in step S425. If it is performed correctly, the bibliographic information service of the multifunction peripheral 300-1 proceeds to step S427. If it is not performed correctly, flow proceeds to step S418.

In step S427, the bibliographic information service of the multifunction peripheral 300-1 deletes the notified name service from the notified name service list of FIG. 18 acquired in step S417, and returns to step S418. Steps S419 to S427 are repeated if it is determined in step S418 that the notified name service is present, and the processing ends when it is determined that the notified name service is not present.

By deleting the name information from the name information file stored by the multifunction peripheral of the name service and deleting the name information from the notified name service list stored by the multifunction peripheral of the bibliographic information service, unnecessary communication is avoided when print data is not present. Therefore, reduction in communication load can be achieved and printing performed from a desired printer.

In the exemplary embodiment, the name information deletion flow described in steps S416 to S427 is between the bibliographic information service of the multifunction peripheral 300-1 and the name service of the multifunction peripheral 300-2. After the status 1401 in the bibliographic information file corresponding to the print data stored in multifunction peripheral 300-3 is changed to the deleted status, the name information deletion described in steps S416 to S427 is performed.

Also, in the exemplary embodiment, based on a deletion instruction from a user, the status 1401 in the bibliographic information file changes to the deleted status or the name information deletion notification. With respect to the print data, where the status 1401 in the bibliographic information file does not change to the deleted status even after a pre-determined period of time has elapsed from the print data generation time, the status 1401 in the bibliographic information file may automatically change to the deleted status after a pre-determined time has passed according to a user instruction. Even when the automatic deletion is performed, the name information deletion flow described in steps S416 to S426 in the exemplary embodiment is performed.

Although the status 1401 in the bibliographic information file is changed to the deleted status according to a deletion instruction from a user, the print data, whose status 1401 is changed to the deleted status, is deleted from the HDD 304 either at a fixed time or at regular intervals.

Although the printing system using the multifunction peripheral is configured to designate the print data in the operation unit of the multifunction peripheral, the printing system may include a printer, such as a laser beam printer, which may not display a print data list.

In this case, when a user logs into the printer and acquires the name information from the multifunction peripheral of the name service, the print data list (bibliographic information list) is acquired from the multifunction peripheral corresponding to the name information, and the print request corresponding to the bibliographic information is made to the multifunction peripheral. When the user acquires the name information from the multifunction peripheral of the name service, without acquiring the print data list, the print request to collectively print the print data corresponding to the logged in user is made to the multifunction peripheral corresponding to the acquired name information (request each of the multifunctional peripherals storing the print data of the logged in user to print all the print data of the logged in user).

While the above-described exemplary embodiment has been described with respect to a multifunction peripheral, any type of printer capable of storing print data is applicable.

The above-described exemplary embodiment references multifunction peripheral 300-1, multifunction peripheral 300-2, and multifunction peripheral 300-3 separately. However, multifunction peripheral 300-2 may include the functionality of multifunction peripheral 300-1 and multifunction peripheral 300-3. Multifunction peripheral 300-1 may include the functionality of multifunction peripheral 300-2 and multifunction peripheral 300-3. In addition, multifunction peripheral 300-3 may include the functionality of multifunction peripheral 300-1 and multifunction peripheral 300-2.

According to the above-described exemplary embodiment, by managing the list of image forming apparatuses storing print data and making print requests to an image forming apparatus according to the list, a reduction in the communication load can be achieved when the print data reserved in the image forming apparatus is printed from a desired image forming apparatus.

In conventional pull print systems, a server is used to store the print data. In the above-described exemplary embodiment, since the print data is reserved in an image forming apparatus, a separate server is not necessary.

In the above-described embodiment, when the user manages the storage destination of the printed data by providing it to the multifunction peripheral and outputs the storage destination, the storage destination of the print data of the logged in user is acquired from the multifunction peripheral managing the storage destination. Therefore, when a commonly used multifunction peripheral is used by other users and thus is not available, the print data may be output from another available printer.

In the above-described exemplary embodiment, since broadcast communication is not used for the storage destination notification, the operation beyond segments is possible. In addition, since the notification can be made just to the multifunction peripheral managing the storage destination, instead of all multifunction peripherals, a structure regarding destinations corresponding to all multifunction peripherals need not be maintained.

Also, in the case where the storage destination has received print data from the client PC, and receives the print data again, notification of is not provided of the receipt of the same printer data. Therefore, the network load may be reduced.

The configuration and contents of various data described above are not limited thereto, and various configuration and contents may be provided according to the usage and purpose.

Although an exemplary embodiment has been described above, the invention may be implemented by, for example, a system, an apparatus, a method, a program, a storage medium, or the like. Specifically, the invention may be applied to a system configured by a plurality of devices, and may be applied to an apparatus configured by a single device.

The program according to the invention is a program that causes a computer to execute the processing methods of the flow charts illustrated in FIGS. 5 to 11 and FIG. 20. A computer-readable storage medium according to the invention stores the program causing a computer to execute the processing methods of FIGS. 5 to 11. In addition, the program according to the invention may be a program for a processing method of each apparatus of FIGS. 5 to 11 and 20.

The above-described aspects of the exemplary embodiment may also be achieved in such a way that the computer-readable storage medium storing the program is supplied to a system or an apparatus and a computer (CPU or MPU) of the system or the apparatus reads and executes the program stored in the computer-readable storage medium.

In this case, the program itself read from the storage medium realizes the novel functions of the invention, and the computer-readable storage medium storing the program constitutes the invention.

As the computer-readable storage medium for supplying the program, for example, a flexible disk, a hard disk, an optical disk, a CD-ROM, a CD-R, a DVD-ROM, a magnetic tape, a nonvolatile memory card, a ROM, an EEPROM, a silicon disk, a solid-state drive, or the like may be used.

Also, the above-described exemplary embodiment may be realized by executing the program read by the computer. Furthermore, it is apparent that an operating system (OS) or the like, which is running on the computer, performs all or part of the actual processing, based on the instruction of the program, and the above-described exemplary embodiment is realized by the processing.

Moreover, the program read from the computer-readable storage medium is written on a function expansion board inserted into the computer or a memory provided in a function expansion unit, a CPU or the like provided in the function expansion board or the function expansion unit performs all or part of the actual processing, based on the instruction of the program code, and the function of the above-described exemplary embodiment is realized by the processing.

Also, the invention is applicable to a system configured by a plurality of devices and is applicable to an apparatus configured by a single device. In addition, it is apparent that the exemplary embodiment can be realized by providing the program to the system or the apparatus. In this case, the system or the apparatus can achieve the effects of the invention by reading the computer-readable storage medium storing the program for achieving the invention on the system or the apparatus.

Moreover, the program for achieving the invention is downloaded and read from a server, a database, or the like on a network, and the system or the apparatus can achieve the effects of the invention. In addition, a combined configuration of each exemplary embodiment described above and a modified example thereof is included in the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-145595 filed Jun. 30, 2011 and Japanese Patent Application No. 2012-066992 filed Mar. 23, 2012, which are hereby incorporated by reference in their entirety.

What is claimed is:

1. A printing system including a plurality of image forming apparatuses that store print data, the plurality of image forming apparatuses connected to each other and include a first image forming apparatus and a second image forming apparatus, wherein the first image forming apparatus comprises:

a first storage control unit configured to store print data and bibliographic information of the print data in a first storage unit;

an image forming apparatus information transmission unit configured to transmit identification information for identifying the first image forming apparatus to the second image forming apparatus and to indicate that print data is stored in the first image forming apparatus;

an image forming apparatus information request unit configured to request, from the second image forming apparatus, a list of image forming apparatuses that are storing print data to print the print data stored in the first storage unit;

an image forming apparatus list reception unit configured to receive the list of image forming apparatuses;

a print data list request unit configured to request a list of print data from image forming apparatuses corresponding to the received list of image forming apparatuses;

a print data list reception unit configured to receive the list of print data;

a print request unit configured to make a print request to an image forming apparatus in which the print data is stored;

a printing unit configured to print received print data;

a print data deletion unit configured to delete print data or to change the print data to a deleted status; and a deletion notification unit configured to provide a deletion notification to the second image forming apparatus when it is determined that print data is deleted or changed to a deleted status by the print data deletion unit and printable print data is not present, and wherein the second image forming apparatus comprises:

an image forming apparatus information reception unit configured to receive the identification information from the first image forming apparatus;

a second storage control unit configured to store the identification information in a second storage unit;

an image forming apparatus information request reception unit configured to receive a request for a list of image forming apparatuses from the first image forming apparatus;

an image forming apparatus list transmission unit configured to transmit a list of image forming apparatuses in which print data is stored to the first image forming apparatus;

a deletion notification reception unit configured to receive the deletion notification from the first image forming apparatus; and an image forming apparatus information deletion unit configured to delete the identification information of the first image forming apparatus from the second storage unit according to the deletion notification.

2. The printing system according to claim 1, wherein the first image forming apparatus further comprises:
a transmitted information storage control unit configured to store, in the first storage unit, information transmitted by the image forming apparatus information transmission unit indicating that the second image forming apparatus is the destination of that the identification information was transmitted to; and
a transmitted information deletion unit configured to delete transmitted information corresponding to the second image forming apparatus being a destination of the deletion notification from the first storage unit, and
wherein the image forming apparatus information transmission unit controls transmission of identification information for identifying the first image forming apparatus to the second image forming apparatus according to the transmitted information stored in the first storage unit even when print data is newly received.

3. The printing system according to claim 1, wherein the bibliographic information includes user identification information,
wherein the image forming apparatus information transmission unit transmits the user identification information,
wherein the second storage control unit stores the identification information of the image forming apparatus in the second storage unit with respect to each user identification information,
wherein the deletion notification unit provides a deletion notification, which includes the user identification information and the identification information of the first image forming apparatus, to the first image forming apparatus itself when printable print data corresponding to the user identification information is not present, and
wherein the image forming apparatus information deletion unit deletes the identification information of the first image forming apparatus corresponding to the user identification information according to the user identification information and the identification information.

4. The printing system according to claim 1, wherein the first image forming apparatus further comprises an image forming apparatus determination unit configured to determine whether an image forming apparatus is an image forming apparatus configured to manage a list of image forming apparatuses in which print data is stored, and
wherein when it is determined by the image forming apparatus determination unit that the image forming apparatus is the image forming apparatus configured to manage a list of image forming apparatuses in which print data is stored, the image forming apparatus list reception unit acquires the list of image forming apparatuses from the image forming apparatus.

5. The printing system according to claim 1, wherein the print data list request unit requests the list of print data from the first image forming apparatus itself, and
wherein, when print data selected from the list of print data is stored in the first image forming apparatus, the print request unit acquires the print data from the first image forming apparatus itself.

6. The printing system according to claim 1, wherein the bibliographic information includes user identification information,
wherein the image forming apparatus information transmission unit transmits the user identification information,
wherein the second storage control unit stores the identification information of the image forming apparatus in association with the user identification information, and
wherein the image forming apparatus list transmission unit transmits, according to user identification information of a user who has logged into the first image forming apparatus, a list of image forming apparatuses in which the print data of the user is stored.

7. An image forming apparatus, the image forming apparatus comprising:
a storage control unit configured to store print data and bibliographic information of the print data in a storage unit;
an image forming apparatus information transmission unit configured to transmit identification information for identifying the image forming apparatus to another image forming apparatus and to notify that print data is stored in the image forming apparatus;
an image forming apparatus information request unit configured to request a list of image forming apparatuses in which print data is stored from the another image forming apparatus to print the print data stored in the storage unit;
an image forming apparatus list reception unit configured to receive the list of image forming apparatuses, which are storage destination of print data from the another image forming apparatus according to the request for the list of image forming apparatuses;
a print data list request unit configured to request a list of print data from image forming apparatuses corresponding to the received list of image forming apparatuses;
a print data list reception unit configured to receive the list of print data from the image forming apparatuses requested according to the request from the print data list request unit;
a print request unit configured to make a print request to an image forming apparatus in which the print data is stored according to the list of print data;
a printing unit configured to print received print data according to the print request;
a print data deletion unit configured to delete print data or to change the print data to a deleted status; and
a deletion notification unit configured to provide a deletion notification to the another image forming apparatus when it is determined that print data is deleted or changed to a deleted status by the print data deletion unit and printable data is not present.

8. An image forming apparatus comprising:
an image forming apparatus information reception unit configured to receive identification information from another image forming apparatus;
a storage control unit configured to store the identification information in a storage unit;
an image forming apparatus information request reception unit configured to receive a request for a list of image forming apparatuses from the another image forming apparatus;
an image forming apparatus list transmission unit configured to transmit a list of image forming apparatuses in which print data is stored to the another image forming apparatus;
a deletion notification reception unit configured to receive a deletion notification from the another image forming apparatus; and
an image forming apparatus information deletion unit configured to delete the identification information of the another image forming apparatus from the storage unit according to the deletion notification.

9. A method for printing, the method comprising storing print data and bibliographic information of the print data in a first storage location;

transmitting identification information for identifying a first image forming apparatus to a second image forming apparatus for notifying that print data is stored in the first image forming apparatus;

requesting a list of image forming apparatuses that are storing print data to print the print data stored in the first storage location;

receiving the list of image forming apparatuses;

requesting a list of print data from image forming apparatuses corresponding to the received list of image forming apparatuses;

receiving the list of print data from the image forming apparatuses;

making a print request to an image forming apparatus in which the print data is stored according to the list of print data;

printing received print data;

deleting print data or changing the print data to a deleted status;

providing a deletion notification to the second image forming apparatus when it is determined that print data is deleted or changed to a deleted status by the print data deletion unit and printable print data is not present;

receiving the transmitted identification information;

storing the received identification information in a second storage location;

receiving a request for a list of image forming apparatuses that are storing print data;

transmitting a list of image forming apparatuses in which print data is stored receiving the deletion notification from the first image forming apparatus; and deleting the identification information of the first image forming apparatus from the second storage location according to the deletion notification.

10. A method for an image forming apparatus, the method comprising:

storing print data and bibliographic information of the print data;

transmitting identification information for identifying the image forming apparatus to another second image forming apparatus and to notify that print data is stored in the image forming apparatus;

requesting a list of image forming apparatuses in which print data is stored from the another image forming apparatus;

receiving the list of image forming apparatuses, which are storage destination of print data, from the another image forming apparatus according to the request for the list of image forming apparatuses;

requesting a list of print data from image forming apparatuses corresponding to the received list of image forming apparatuses;

receiving the list of print data from the image forming apparatuses requested according to the request for the list of print data;

requesting print data from an image forming apparatus in which the print data is stored according to the list of print data;

printing received print data according to the print request;

deleting print data or changing the print data to a deleted status; and providing a deletion notification to the another image forming apparatus when it is determined that print data is deleted or changed to a deleted status and printable print data is not present.

11. A computer-readable storage medium storing a program for causing an image forming apparatus to execute the method of claim 10.

12. A method for an image forming apparatus, the method comprising:

receiving identification information of another image forming apparatus;

storing the identification information as an image forming apparatus in which print data is stored;

receiving a request for a list of image forming apparatuses from the another image forming apparatus;

transmitting a list of image forming apparatuses in which print data is stored to the another image forming apparatus according to the request for the list of image forming apparatuses;

receiving a deletion notification from the another image forming apparatus; and deleting the identification information of the another image apparatus according to the deletion notification.

13. A computer-readable storage medium storing a program for causing an image forming apparatus to execute the method of claim 12.

* * * * *